United States Patent
O'Leary et al.

(10) Patent No.: US 6,704,714 B1
(45) Date of Patent: Mar. 9, 2004

(54) VIRTUAL PRIVATE LOCK BOX

(75) Inventors: Denis O'Leary, New York, NY (US); Vincent D'Agostino, New York, NY (US); S. Richard Re, Westfield, NJ (US); Jessica Burney, New York, NY (US); Adam Hoffman, New York, NY (US)

(73) Assignee: The Chase Manhattan Bank, NY (US)

( * ) Notice: Subject to any disclaimer, the term of this patent is extended or adjusted under 35 U.S.C. 154(b) by 0 days.

(21) Appl. No.: 09/497,334

(22) Filed: Feb. 3, 2000

Related U.S. Application Data

(60) Provisional application No. 60/173,044, filed on Dec. 23, 1999, provisional application No. 60/163,828, filed on Nov. 5, 1999, provisional application No. 60/161,300, filed on Oct. 22, 1999, provisional application No. 60/150,725, filed on Aug. 25, 1999, and provisional application No. 60/132,305, filed on May 3, 1999.

(51) Int. Cl.[7] ............................................. G06F 17/60
(52) U.S. Cl. ........................... 705/39; 705/40; 705/41; 705/42; 705/43; 705/44; 705/45
(58) Field of Search ................ 705/39, 30–33, 705/35–45

(56) References Cited

U.S. PATENT DOCUMENTS

| | | |
|---|---|---|
| 3,852,571 A | 12/1974 | Hall et al. |
| 4,321,672 A | 3/1982 | Braun et al. |
| 5,287,269 A | 2/1994 | Dorrough et al. |
| 5,455,407 A | 10/1995 | Rosen |
| 5,461,217 A | 10/1995 | Claus |

(List continued on next page.)

FOREIGN PATENT DOCUMENTS

| | | |
|---|---|---|
| EP | 0421808 | 5/1990 |
| WO | 9745796 | 4/1997 |

(List continued on next page.)

OTHER PUBLICATIONS

Jim Middlemiss, Bank technology News, v12, n1, p. 15, 1/99.*

(List continued on next page.)

*Primary Examiner*—Vincent Millin
*Assistant Examiner*—Richard Fults
(74) *Attorney, Agent, or Firm*—Dickstein, Shapiro, Morin & Oshinsky, LLP.

(57) ABSTRACT

A system and method for effectuating Electronic Funds Transfer credit messages. The main structural components of the system include a Payment Portal Processor (PPP), an Internet Pay Anyone (IPA) Account, a Virtual Private Lockbox (VPL) and an associated Account Reporter, the existing EFT networks, and a cash card for accessing a VPL or IP account. The PPP is a software application that provides a secure portal for accessing (linking to) either the user's Demand Deposit Account (DDA) or an IPA account and can be combined with the functionality of a traditional digital Wallet. Consumers use a PPP enhanced Wallet to fund their account, shop on the web, pay bills, pay anyone, store electronic receipts and transaction history, and check their recent PPP enhanced Wallet activity. The IPA account is a special purpose account with limited functionality for making electronic payments in the form of EFT credit messages. The VPL is a limited function receive only account for receiving electronic payments through the EFT. The Account Reporter is a portal to view transaction history and balance of IPA and VPL accounts, provide online, real-time transaction reports, and to reconciles accounts receivable/purchase records against incoming EFT payment records. A physical card can be associated with either an IPA or VPL account in order to provide PIN debit capability.

61 Claims, 9 Drawing Sheets

U.S. PATENT DOCUMENTS

| | | | |
|---|---|---|---|
| 5,465,206 A | * 11/1995 | Hilt et al. | 364/406 |
| 5,477,038 A | 12/1995 | Levine et al. | |
| 5,511,114 A | 4/1996 | Stimson et al. | |
| 5,577,109 A | 11/1996 | Stimson et al. | |
| 5,590,197 A | 12/1996 | Chen et al. | |
| 5,650,604 A | 7/1997 | Marcous et al. | |
| 5,673,309 A | 9/1997 | Woynoski et al. | |
| 5,677,955 A | * 10/1997 | Doggett et al. | 380/24 |
| 5,692,132 A | 11/1997 | Hogan | |
| 5,696,908 A | 12/1997 | Muehlberger et al. | |
| 5,727,163 A | 3/1998 | Bezos et al. | |
| 5,732,136 A | 3/1998 | Murphree et al. | |
| 5,742,845 A | 4/1998 | Wagner | |
| 5,745,886 A | 4/1998 | Rosen | |
| 5,757,917 A | 5/1998 | Rose et al. | |
| 5,796,832 A | 8/1998 | Kawan | |
| 5,815,657 A | 9/1998 | Williams et al. | |
| 5,825,003 A | 10/1998 | Jennings et al. | |
| 5,826,241 A | 10/1998 | Stein et al. | |
| 5,826,245 A | 10/1998 | Sandberg-Diment | |
| 5,864,830 A | 1/1999 | Armetta et al. | |
| 5,870,456 A | 2/1999 | Rogers | |
| 5,870,724 A | 2/1999 | Lawlor et al. | |
| 5,903,878 A | 5/1999 | Talati et al. | |
| 5,920,847 A | * 7/1999 | Kolling et al. | 705/40 |
| 5,937,396 A | 8/1999 | Konya | |
| 5,943,423 A | 8/1999 | Muftic | |
| 5,949,044 A | 9/1999 | Walker et al. | |
| 5,952,638 A | 9/1999 | Demers et al. | |
| 5,963,647 A | 10/1999 | Downing et al. | |
| 5,963,648 A | 10/1999 | Rosen | |
| 5,991,749 A | 11/1999 | Morrill, Jr. | |
| 6,003,764 A | 12/1999 | De Rooij et al. | |
| 6,010,067 A | 1/2000 | Elbaum | |
| 6,012,048 A | 1/2000 | Gustin et al. | |
| 6,014,646 A | 1/2000 | Vallee et al. | |
| 6,021,202 A | 2/2000 | Anderson et al. | |
| 6,032,133 A | * 2/2000 | Hilt et al. | 705/40 |
| 6,032,135 A | 2/2000 | Molano et al. | |
| 6,032,136 A | 2/2000 | Brake, Jr. et al. | |
| 6,065,675 A | 5/2000 | Teicher | |
| 6,105,008 A | 8/2000 | Davis et al. | |
| 6,112,984 A | 9/2000 | Snavely | |
| 6,149,055 A | 11/2000 | Gatto | 235/379 |
| 6,173,272 B1 | 1/2001 | Thomas et al. | 705/42 |
| 6,285,991 B1 | 9/2001 | Powar | |
| 6,311,170 B1 | 10/2001 | Embrey | |
| 6,354,491 B2 | 3/2002 | Nichols et al. | |
| 6,366,893 B2 | 4/2002 | Hannula et al. | |

FOREIGN PATENT DOCUMENTS

| | | |
|---|---|---|
| WO | 9745814 | 4/1997 |
| WO | 9809260 | 5/1998 |
| WO | 9849658 | 5/1998 |
| WO | 9910823 | 4/1999 |
| WO | WO 0067177 | 11/2000 |

OTHER PUBLICATIONS

Princeton Telecom Newswire, Dec. 1, 1998 & Princeton Telecom PR Newswire, Dec. 1, 1997.*
Princeton eCom News Release, Jul. 20, 1999.*
Corporate EFT Report, v19, n9, Apr. 12, 1999 & G. Jay Francis et al, Principles of Banking, 6th Edition, American Bankers Assoc. 1998.*
"Telebank Depository Agreement (Part 2), Including Electronic Funds and Funds Availability Disclosure", http://www.telebankonline.com/telebank/products/deposit_agree2.asp.
Blue Notes "Electronic Wallets with BlueNotes" (BlueMoney Software Corporation), http:/www.bluemoney.com/comprod/products/bluenotes/ewallets/html.
IBM Intellectual Property Network, "TDB: Anonymous Delivery of Goods in Electronic Commerce" IBM Technical Disclosure Bulletin, Mar. 1996, p. 363–366.
"CardTrak" (Kmart Cash Card), www.ramsearch.com/cardtrak/news/6e_97.html.
"Cash Cards" (Citgo Credit),www.citgo.com/credit_card/citgo_cards/cash_cards.asp.
"CashCard Consumer Information Page" (C–One, Cash-Card for Open Network E–Commerce), www.nets.com.sg/services/cashcard/c–one/consumer.html.
"Loose Change—What is a Prepaid Debit Cashcard" ("Loose Change" MoneyCard Corporation), www.kidscashcard.com/what.htm.
"Visa TravelMoney" (Visa Products and Services), www.s2.visa.com/pd/trav/main.html.
S. Collett, "New Online Payment Options Emerging", Jan. 2000, American Banker.
J. Weitzman, "Star Trek Promise Fulfilled: Wireless Cash Transfer", American Banker.
N. Deighton, "Bluetooth: The Missing Link in Mobile E–Commerce?", Sep. 17, 1999, The Gartner Group.
R. Egan, "CIO and CEO Alert: Wireless Access Is a Growth Enabler for E–Business", Nov. 17, 1999, The Gartner Group.
R. Egan, "Wireless Access: An E–Business 'Growth Hormone'", Oct. 11, 1999, The Gartner Group.
N. Deighton, "CEO and CIO Alert: Mobile Phone Adoption Provides an Advantage in E–Business", Oct. 29, 1999, The Gartner Group.
N, Deighton, "Mobile Adoption: Walking Away With E–Commerce?", Sep. 9, 1999, The Gartner Group.
K. Dulaney, "AvantGo Bids to Put the Web in Motion", Nov. 18, 1999, The Gartner Group.
R. De Lotto, et al., "Impact of MADs on Internet Financial Services", Apr. 19, 1999, The Gartner Group.
A. Litan, "Credit Card Payments Over the Web: What are the Options?", Nov. 3, 1998, The Gartner Group.
K. Kerr, "Internet Micropayment Solutions Continue to Evolve", Nov. 10, 1999, The Gartner Group.
InterCoin, http://www.intercoin.com/.
iPIN, http://www.ipin.com/.
PayPal, http://www.paypal.com/cgi–bin/weber?cmd=index.
X.com, http://www.x.com/news_merger.htm.
http://www.icanbuy.com/info/signup_popup.cfm.
Rocket Cash, http://www.rocketcash.com/re/sign_up/sign-up.html.
mon–e, wysiwyg://119/http://www.mon–e.com/.
eCash, http://www.ecash.net/.
doughnet, Wysiwyg://29/http://www.doughnet.com/.
Cybermoola, http://www.cybermoola.com/.
Pocketcard, http://www.pocketcard.com/.
echarge, http://www.echarge.com/index.htm.
Magex, wysiwyg://175/http://www.magex.com/.
kidscashcards, http://www.kidscashcard.com/main/htm.
InternetCash, http://www.internetcash.com.
tradesafe.com, http://www.tradesafe.com.
Billpoint, http://www.billpoint.com/.
flooz, http://www.flooz.com/homesub/guide.asp.
Millicent, http://www.millicent.digital.com/works/index.html.
Ibill, http://www.ibill.com/main–customerservice.html.

Electronic billing & payment, http://www.checkfree.com/ebp/detail/1,1520,26,00.html.

Transpoint, http://www.transpoint.com/.

NetCharge, http://www.netcharge.com/.

paymybills, http://www.paymybills.com/demo/demoin.html.

StatusFactory, http://www.statusfactory.com/.

eMoneyMail, http://www.emoneymail.com/.

econnect, http://www.econnectholdings.com/intro/intro.htm.

ecount, http://www.ecount.com/.

* cited by examiner

VIRTUAL PRIVATE LOCK BOX

RELATED APPLICATION

This application is based on and claims priority to U.S. Provisional patent applications Ser. Nos.: 60/132,305, filed May 3, 1999; Ser. No. 60/150,725, filed Aug. 25, 1999; Ser. No. 60/161,300, filed Oct. 22, 1999; Ser. No. 60/163,828, filed Nov. 5, 1999; and Ser. No. 60/173,044, filed Dec. 23, 1999, the entire disclosures of which are hereby incorporated by reference.

FIELD OF THE INVENTION

The present invention generally relates to systems and methods for conducting electronic commerce, and more particularly to systems and method in which a payor pushes electronic credits to a payee using an Electronic Funds Transfer system.

BACKGROUND OF THE INVENTION

Presently, there are several methods by which a consumer can electronically pay for purchases made on the Internet, such as credit cards, off-line debit cards, online debit cards, digital cash, and smart cards. Each of these methods has its own advantages and disadvantages. An off-line debit card uses the traditional credit card system for clearing the payment but no Personal Identification Number (PIN) is required. The use of an on-line debit card requires that the consumer supply his or her PIN, and the amount of the purchase is debited from the consumer's account instantaneously. One disadvantage with both the on and off-line debit cards, from a consumer's point of view, is the inability to reverse or repudiate the transaction. In contrast, by use of a credit card, the consumer at a later date can reverse the transaction (e.g., if the purchased goods are never shipped to the consumer).

It is predicted that credit cards will be the dominant on-line point of sale (POS) payment choice for at least the next five years. While new Internet payment mechanisms have been rapidly emerging, consumers and merchants have been happily conducting a growing volume of commerce using basic credit card functionality. None of the emerging efforts to date have gotten more than a toehold in the market place and momentum continues to build in favor of credit cards.

At the present time, there are several large market segments for an online payment system. First, high volume, low dollar payments from consumers to providers of on-line digital intellectual products or services such as written materials, music, software or games. These can either be 'Intrapreneurs,' individuals or small merchants marketing their products directly to consumers, or larger intermediaries, either traditional retail merchants or auction sites that aggregate consumers and sellers to facilitate sales. A second large market segment involves electronic payments from consumers to other consumers. A third and growing market segment resides in business to business electronic payments.

The market opportunity will continue to explode as what is currently thought of as the Internet continues to expand. In general, the Internet is thought of as Personal Computer (PC) and telephone based. However, that model is quickly changing to include broadband communication via terrestrial links such as Digital Subscriber Line (DSL), wireless and two-way cable. The end number of devices is also expanding to include cellular phones with video displays as well as interactive television, Personal Digital Assistants (PDAs) and kiosks with Internet access. Both of these changes will only serve to increase the number of end points and consumers who will have a need for high-volume, low dollar payment capabilities.

Overall, retail consumer sales as well as business to business sales on the Internet are projected to grow exponentially. The bulk of the payments for these sales are expected to be done with credit cards, which are widely available and owned, are supported by an established infrastructure and provide merchants and consumers with a high degree of surety of payment and receipt. While there are clear differences in the ways in which consumers use credit cards, traditionally, consumers have used them for larger dollar purchases. In recent years, debit cards have entered the market and have been used as cash and check replacements, replacing lower-dollar volume transactions for purchases of consumable products such as food and gasoline.

Debit and credit card transactions are currently processed using the Electronic Funds Transfer EFT network. The debit message comprising the transaction is carried over the EFT network from the point of origination (e.g., a Point of Sale (POS) location, an ATM machine, or an Internet merchant) to the financial institution that issued the card (or its representative). Currently, only debit messages are carried by the EFT network, including debit reversal messages. A debit reversal message reverses a previously processed debit transaction and is generally not considered a credit.

U.S. Pat. No. 5,220,501 to Lawlor, et al., describes a home banking and bill payment system that uses the EFT network. As described in the patent, the systems and methods of Lawlor performs a traditional debit pull from the user's bank account using the EFT network and subsequently makes payments using conventional means such as the ACH network or paper checks. Furthermore, the system of Lawlor uses a centralized computer to which the user attaches via a dedicated phone connection as opposed to connecting through the Internet.

Although credit and debit cards have emerged as the most popular form of payment over the Internet, there are drawbacks associated with each of these payment types. Notably, each have a relatively high cost that includes a processing fee plus a merchant discount of 1.4% and up. The relatively high fees support the credit card business model. While credit and debit cards may continue to be a viable payment option for merchants selling relatively high ticket items over the Internet, credit and debit cards are not economically viable for purchases of lower cost items. For lower-cost items, the relatively high transaction processing fees plus the discount result in the transaction processing fee consuming a relatively high proportion of the total revenue generated by the product sale. These characteristics of a low cost item lend themselves to a low cost payments solution that is guaranteed, yet does not require the payee to bear the burden and risk of authentication.

The Internet is spawning a direct model in which manufacturers of products or services are able to deal directly with consumers. This model has several implications for the payment process. First, by eliminating the middleman, the direct model is resulting in intense price competition, with manufacturers having much tighter margins. This competition creates the need to minimize all costs especially payment processing costs. Second, the Internet enables the development of large numbers of independent producers to 'set up shop' on the Internet and immediately have access to large numbers of consumers. Third, a large and increasing number of intellectual products such as publications, music, video, software, games are more efficiently distributed digitally over the Internet rather than through traditional physical (paper or disc) media. While this trend has already started, as higher bandwidth and increasingly sophisticated devices enter the marketplace, it is expected to increase significantly. Many of these purchases will have the following characteristics: low cost to the consumer and the ability to purchase individual works (i.e.: a song, a video, an article, a game). These characteristics call for a payment form that has a low cost.

By combining these two trends—direct merchant to consumer distribution from independent 'intrapreneurs', and the ability to distribute products digitally—a new marketplace has emerged for low dollar, high volume, real-time payments with payment surety for both consumers and producers. Larger intermediaries, such as existing on-line merchants and auction sites will also benefit from a low-cost payment device for high-volume, low-dollar payments for all of the same reasons outlined above. On-line merchants are currently-facing a variety of problems including a low volume of on-line purchases relative to the number of site viewers; a high volume of charge-backs for on-line purchases; non-integrated 'patchwork' systems for payment processing; high fraud rates and high processing fees. All of these factors serve to depress the potential number of customers who are comfortable purchasing on line as well as depressing the profitability of on-line merchants.

Furthermore, to date, there is no efficient way for consumers to make payments to other consumers using the Internet. All traditional forms of person-to-person exchange include the physical exchange of cash or checks rather than a real-time digital exchange of value. In addition, the high cost of retail wire transfers (i.e., Western Union) is cost prohibitive to a significant portion of society.

Automated Clearing House (ACH) payments have begun to be used with respect to payments made via the Internet. These types of transactions typically involve payments made with respect to loans, insurance and utilities. It is predicted that ACH payments will not be widely deployed to on-line POS for two reasons. First, an ACH transaction does not provide transaction authorization, and secondly, authentication requires a pre-existing relationship between the customer and the merchant. Furthermore, ACH payments have to be received, deposited and cleared before the funds are available. In contrast to ACH transactions, credit and off-line debit cards require authorization but not authentication. Similarly, on-line debit requires authentication (i.e., a PIN or other authentication). As with credit and debit card transactions, ACH transactions requires that the user provide the merchant (payee) with the "keys" to the user's account. This pull model of effectuating payments again raises the security concerns discussed herein (e.g., fraud).

Two significant drawbacks with some or all of the above models for Internet POS payments are that: 1) a pre-existing relationship between the consumer and the merchant must exist; and 2) the consumer is required to provide the merchant with his or her account and/or PIN. The first drawback of some of the above models cannot be practically overcome as it is impossible for a consumer to have pre-existing relationships with all of the potential merchants conducting business on the Internet. With respect to the provision of the consumer's account and PIN number over the Internet, even though mail order companies have been operating in this manner for years, many consumers feel uneasy about electronically providing their account and PIN numbers to strangers over the Internet.

FIG. 1 depicts the conventional debit/credit transaction model. In this model, if the consumer 100 desires to buy a compact disc (CD) from a web retailer 110, the consumer 100 electronically transmits its debit or credit card number and/or PIN to the web retailer 110. Upon receipt of this information from the consumer 100, the retailer 110 submits the proposed transaction to its bank 120 or merchant acquirer via the EFT system (not shown) for approval. The merchant's bank 120 then contacts the bank 130 (issuer bank) which issued the debit/credit card to the consumer 100. The issuer 130 checks the consumer's balance on the card and either approves or rejects the proposed transaction. This approval or denial is transmitted from the issuer bank 130 back to the merchant bank 120 which then informs the web retailer 110 of the approval or denial. If the charge to the debit/credit card was approved, the transaction is completed by the web retailer 110 shipping the goods to the consumer 100.

Some of the same drawback described above with respect to Internet shopping equally apply to electronic bill payment. The first drawback, requiring a pre-existing relationship between the consumer and bill payee is not as great a concern because this relationship most likely already exists between the consumer and the payee (e.g., the telephone, cable or utility company). The second drawback which requires the consumer to provide the payee with his or her account and/or PIN still remains a concern with electronic bill payment. Although fraud is less of a problem for bill payment, since the consumer presumably has regular dealings with the payee, some consumers still view the provision of the payee with at least his/her account number a diminution in the consumer's privacy.

SUMMARY OF THE INVENTION

The present invention represents a new paradigm for effectuating electronic payments that leverages existing platforms, conventional payment infrastructures and currently available web-based technology to enable e-commerce in both the virtual and physical marketplace. The concept provides a safe, sound, and secure method that allows users (consumers) to shop on the Internet, pay bills, and pay anyone virtually anywhere, all without the consumer having to share account number information with the payee. Merchants receive immediate payment confirmation through the Electronic Funds Transfer (EFT) network so they can ship their product with confidence that the payment has already been received. The present invention further enables small dollar financial transactions, allows for the creation of "web cash" as well as provides facilities for customer service and record-keeping.

The structural components to the system of the present invention include: a Payment Portal Processor; a digital Wallet; an Internet Pay Anyone (IPA) Account; a Virtual Private Lockbox (VPL); an Account Reporter; the existing EFT networks; and a cash card. The Payment Portal Processor (PPP) is a software application that augments any Internet browser with e-commerce capability. The PPP software sits in front of and provides a secure portal for accessing (linking to) the user's Demand Deposit Accounts (DDA) and IPA accounts. The PPP enables the user to push electronic credits from its DDA and IPA accounts to any other accounts through the EFT network.

Although the PPP can be used as a stand alone product, in a preferred embodiment, the functionality of the PPP is directly incorporated into a new form of PPP enhanced digital Wallet in order to enhance the consumer's Internet shopping experience. Alternatively, hooks to the PPP can be incorporated into existing digital Wallets to add the unique payment feature of the PPP. Furthermore, features of online banking (e.g., funds transfers) can be incorporated into the PPP to allow for account maintenance and IPA account funding. In association with the traditional Wallet functionality and the Account Reporter of the present invention, the PPP is used to fund consumer's accounts, shop on the web, pay bills, pay anyone, store electronic receipts and transaction history, and review the user's recent account and shopping activity. The PPP thus provides consumers with a safe, secure, and convenient way to conduct financial transactions over the Internet.

The majority of the prior art electronic Wallets on the Internet today are primarily used as a convenience vehicle, merely providing a method of storing account number information and other form filling functions (e.g., shipping addresses). In contrast to traditional Wallets, the PPP enhanced Wallet of the present invention is associated with one or more DDA and/or IPA accounts. The PPP thus provides the user with a form of virtual cash that is secure and guaranteed. The PPP further contains a receipt feature and archive feature that maintains a transaction history of all payment activity with respect to accounts linked to the PPP. The PPP further has the capability to store miles, coupons, sweepstakes or other marketing incentives associated with use of the accounts linked to the PPP. The PPP enhanced Wallet enriches the consumer e-commerce experience by eliminating the tedious process of filling out lengthy payment and shipping fields as this is done automatically. Merchants significantly benefit from the credit push and form filling features of the PPP enhanced Wallet, since research indicates that most e-commerce purchases are abandoned at the POS due to consumers' unwillingness to complete lengthy forms or provide personal credit card numbers. Furthermore, the automatic form filling features of the PPP enhanced Wallet reduces shipping errors, as the "ship to" address is automatically filled in, eliminating manual entry errors.

The IPA account is a special purpose account with limited functionality for originating electronic payments. Funds in an IPA account can only be accessed electronically by the user of the account using standard authentication procedures (e.g., a PIN). The electronic access to the IPA account can be accomplished through a PC, card reader, PDA, Interactive TV and cell phone technology, for example. This restriction provides an added level of consumer protection in that the consumer never has to provide any of its account information to any strangers. The above described PPP (operated by the user) securely communicates with the IPA account to initiate payments according to the present invention. One essential feature of the present invention, completely contrary to the prior art, is that payments made from the IPA account are transmitted to the payee as a credit over the secure EFT network. As discussed above, only debit related transactions are currently initiated on the EFT system. The EFT credit message of the present invention thus represent a significant advancement in art which has no peers with respect to electronic commerce.

Similar to an IPA, the VPL is a limited function account. While an IPA can be accessed electronically, a VPL is constructed with a "receive only" functionality that enables a merchant (or any party) to receive electronic payments through the EFT. Therefore a VPL is a secure address that can be provided to the public as a means of receiving funds. These funds can then be automatically swept to either the user's corresponding DDA or IPA account, preferably once a day. As will be further described below, there are several types of VPL accounts according to the present invention: one for consumers, one for merchants and one that is initially linked to a cash card as described below. The card VPL is a receive only account that can only be debited via the use of the cash card and a PIN. The consumer and merchant VPLs can similarly be PIN debited to access the funds in the account. Unlike an IPA account, the VPL account cannot be used for initiating EFT credit messages. In one embodiment of the present invention, the IPA and VPL accounts are logically one account with two addresses for account. One address, (the IPA address) is only known to the user (and its issuing institution) and is used to make payments from the account. The other address, the VPL address, is used to receive electronic credits and can be freely published without any fear of fraud.

The Account Reporter is a portal for consumers or business to view the balance and transaction history of an IPA or VPL account. In addition to the features described above intended for use with an IPA account, the Account Reporter includes special functionality intended for use by merchants in association with their VPL accounts. The Account Reporter provides online, real-time transaction reports, and reconciles accounts receivable/purchase records against incoming EFT payment records. In addition, the transaction history of the VPL can be archived and retrieved via a payment search engine in the Account Reporter. This provides the merchant with powerful data mining, customer service, and order fulfillment (warehouse, shipping, supply chain management) tools at their fingertips. Credit card purchases on the web according to prior art methods are not connected to a cash management program. In contrast to these prior art systems, the VPL, connected with the Account Reporter, offers a complete purchasing and cash management opportunity for a merchant. The VPL and Account Reporter combination provides a merchant with instant payment receipt verification, accounts receivable functionality, order fulfillment facilitation, inventory control/supply chain management facilitation and data mining capability.

The Account Reporter is a flexible component offering instant payment confirmation, reconciliation and record retention so that merchants can track purchase orders against actual payments in real time. Every VPL transaction can be stored, searched, and retrieved. This archival/retrieval functionality is the perfect instrument for customer service and data mining. The Account Reporter offers all of the above features, without the need to actively engage in funds management as is required with the prior art.

Using the structures described above, the methods of the present invention allow consumers and businesses to conduct secure and economical shopping on the Internet, to pay anyone online, pay anyone funds online, pay bills electronically online, and even use a linked cash card. The methods and structures of the present invention enable e-commerce in both the virtual and physical marketplace through the use of legacy platforms, the conventional payments infrastructure and currently available web-based technology.

The present invention furthermore solves many, if not all, of the problems of the prior art described above. Currently, all Internet transactions use "pull" technology in which a merchant must receive the consumer's account number (and in some cases PIN number) in order to complete a payment. The payment methods of the present invention conversely use "push" technology in which users (consumers or businesses) push an EFT credit from their IPA or DDA accounts to a merchant's account, without having to provide their own sensitive account information.

The present invention provides an enhanced level of security because sensitive financial information is not carried over the Internet. All of the financial transactions are executed through the secure EFT network. This method of the present invention provides buyers and sellers with the comfort that their transactions are both secure and private. Furthermore, since payment confirmations are immediately received through the EFT network, sellers can rest assured that the buyer's funds are "good" before the purchase transaction is completed (i.e., before the goods are released (shipped) to the consumer).

The present invention provides significant economic advantages over the prior art systems and methods. The majority of the technology required to implement the present invention already exists, which results in reduced startup costs for an institution practicing the present invention. Payments made according the present methods pass through a mature, established EFT switch which results in a low transaction cost. The payment mechanisms of the prior art are not optimal for processing small dollar transactions. However, the efficient, low cost architecture of the present invention supports payments of any size and is perfect for low dollar purchases. This architecture supports the growing need for Internet micro-payments for goods such as on line articles and music files, yet supports large value payments as well.

By the structures and methods of the present invention, the two most significant disadvantages of the prior art online shopping methods described above have been overcome. First of all, the buyer (consumer or business) is no longer providing its confidential financial information to strangers over the Internet. Rather, the buyer is dealing directly with its own trusted institution (in a preferred embodiment a bank). Furthermore, no pre-existing relationship has to exist between the customer and the merchant.

For the merchant, the present invention significantly reduces the transactional cost as compared to the use of credit cards. The method also provides a reduction in fraud and credit losses, while the finality of the transaction virtually eliminates dispute and chargeback processing from the viewpoint of the financial institution. For financial institutions, the present invention all but eliminates the potential of fraud that is inherent with credit card transactions. As consumers are typically only responsible for the first $50 of fraudulent transactions, banks typically absorb the sometimes significant costs associated with fraud. The ability for hackers to steal consumer's account numbers (e.g., credit card numbers) from an Internet merchant is completely eliminated since the merchant never receives such information.

The present invention is not limited to the case of a consumer making purchases from Internet merchants or business to business transactions. The method has further, broader applicability by providing the ability for anyone with an account at an institution to transfer funds to anyone else who also has an account at the same or a different institution. The pay anyone feature of the present invention allows parties to electronically transmit funds instantaneously without the expense of today's wiring fees.

BRIEF DESCRIPTION OF THE DRAWINGS

For the purposes of illustrating the present invention, there is shown in the drawings a form which is presently preferred, it being understood however, that the invention is not limited to the precise form shown by the drawing in which.

DETAILED DESCRIPTION OF THE INVENTION

In contrast to the credit card, on-line and off-line debit and other payment models existing today, one of the unique features of the method of the present invention is the flow of the payment instruction and the payment which follows. In the credit card, on-line and off-line debit models, a buyer provides a seller with an instruction that authorizes the seller to collect funds from the buyer's account. Depending on the system, this debit instruction results in a guaranteed payment in the case of an on-line debit rather than a lengthy wait for funds (such in the case of a check) or something in between in the case of an off-line debit and credit card. The difference between the prior art models and the model of the present invention can be described as the difference between a "pull" and a "push" model. In the conventional models of today, the seller "pulls" the payment from the buyer's account using a debit instruction, while in the present invention the buyer "pushes" an EFT credit to the seller's account.

Figure 1:
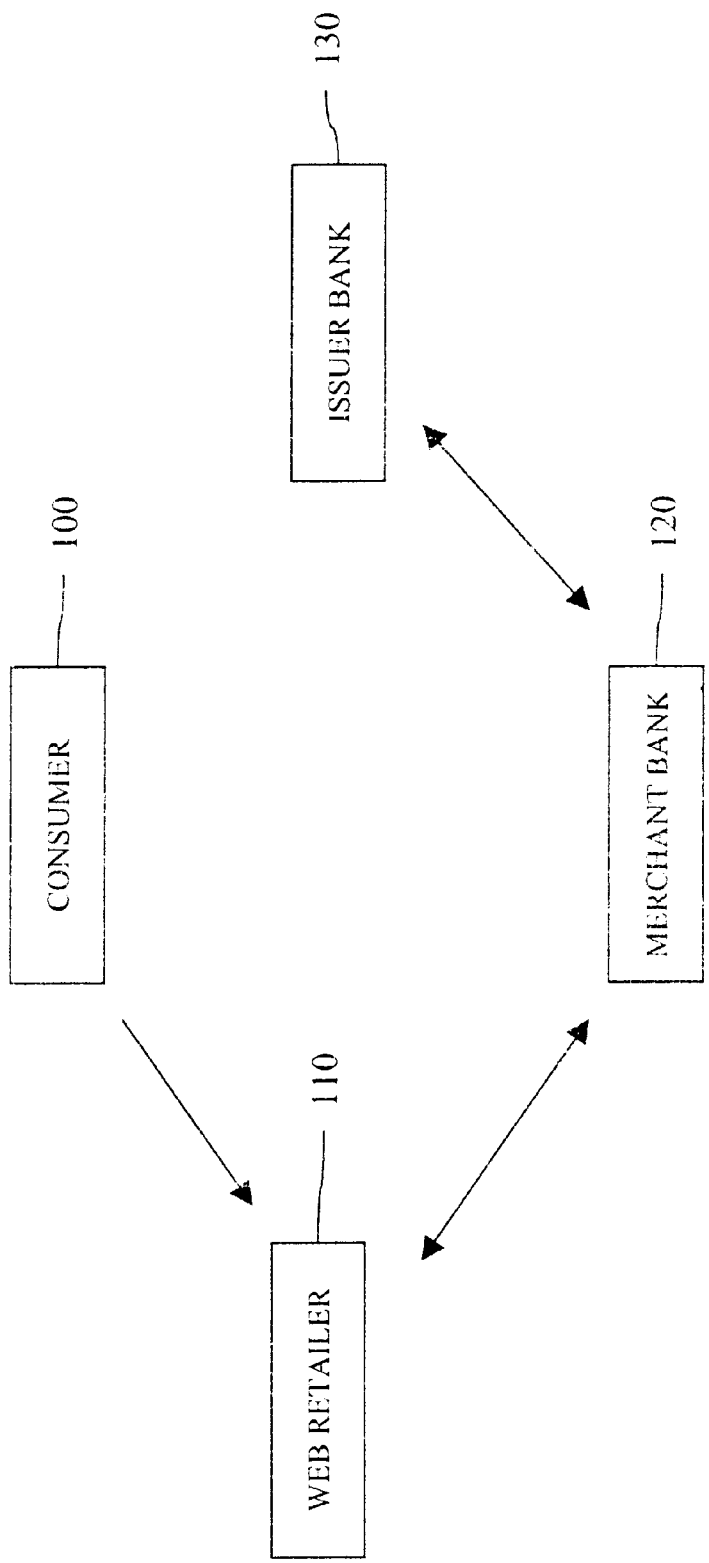
FIG. 1 illustrates the prior art method of Internet payment processing using debit and/or credit cards.
Figure 2:
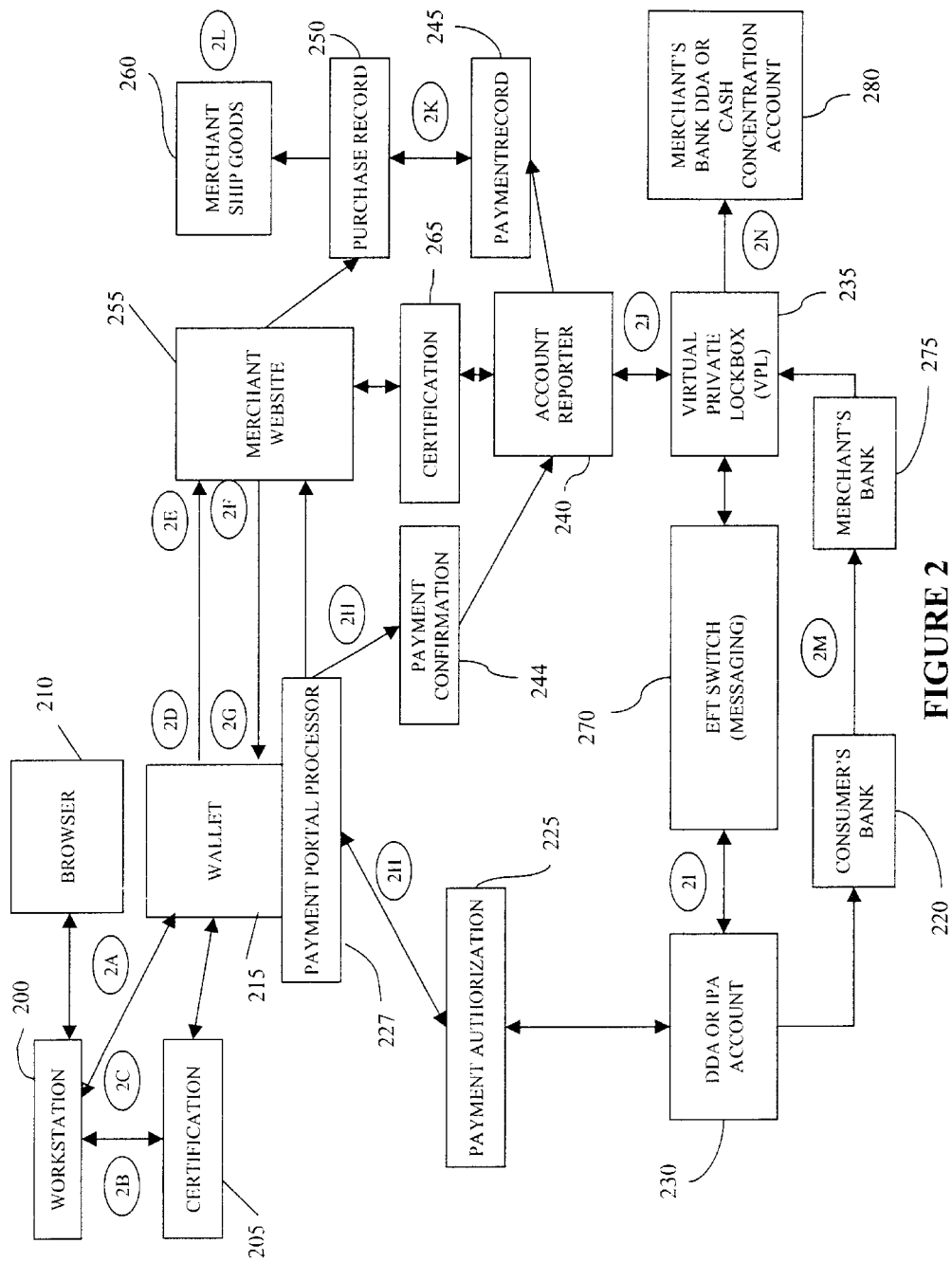
FIG. 2 depicts a first embodiment of the present invention that enables Internet shopping.

FIG. 2 illustrates a first embodiment of the present invention in which a consumer (including businesses acting as consumers) can perform Internet shopping. FIG. 2 further illustrates the main structural components of the present invention. Element 200 represents the device through which the consumer accesses the Internet. In a preferred embodiment, the workstation 200 is a Personal Computer (PC) loaded with an Internet browser 210 such as Netscape™ Navigator™ or Microsoft™ Internet Explorer™. In alternative embodiments, the user can access the Internet using any Internet ready device such as a web enabled ATM machine or a Personal Digital Assistant (PDA) such as a Palm Pilot™, a cell phone or an interactive TV. The present invention is not limited by any particular physical device and can employ any device that provides access to the Internet. For example a public kiosk which provides access to the Internet can be used to practice the present invention.

As the user accesses the Internet using its Browser 210, a Wallet 215 is launched by the user. The Wallet 215 can be downloaded and installed from a website. Using thin wallet technology, the majority of software and databases comprising the Wallet 215 resides on a host web server and the user accesses the Wallet 215 through a website or a button (e.g., icon) on the Browser 210. Some functionality of the Wallet 215 can be operated on the workstation 200 itself, without the requirement of attachment to the Internet. In addition to PC-based access as described above, the Wallet 215 can be downloaded to various non-PC devices such as PDAs, cellular telephones, and interactive TV's. The consumer may access the Wallet 215 while logged onto the Internet by selecting a wallet button on the Browser 210 toolbar, or selecting a wallet icon at the merchant's web site. For non-PC devices, the Wallet 215 can be activated via a separate application, a browser link, or through a sponsoring website. In a preferred embodiment of the present invention, a business, such as a bank, operates the server that hosts the Wallet 215 Application Programming Interface (API). This embodiment provides for additional security of the connection between the Wallet 215 and the user's IPA 230 or other accounts maintained at the institution.

FIG. 2 depicts the preferred embodiment of the present invention in which the Wallet 215 incorporates all of the functionality of the PPP 227 into a single component. Such a PPP enhanced Wallet 215 performs all of the conventional (e.g., form filling) functions of a traditional wallet and further has the payment capability of the PPP 227 as described below. As alternatively depicted in FIG. 3 (discussed below) the Wallet 215 can be the conventional form filling wallet with the appropriate interface to the PPP 227. In a third embodiment (illustrated in FIG. 5 discussed below), the Wallet 215 is not used at all, and the PPP 227 operates as a stand alone component for generating the payment authorization. The following discussion of the PPP enhanced Wallet 215, particularly in regard payment functions apply equally to the PPP 227 when used as a stand alone component or when used in conjunction with a traditional wallet.

The user's log-in to the PPP enhanced Wallet 215 is secure and encrypted to protect the confidentiality of any financial information associated with the operation of the PPP enhanced Wallet 215. Once accessed, a window containing the PPP enhanced Wallet 215 is launched on the workstation 200 and remains open during the user's session. The PPP enhanced Wallet 215 window has the ability to communicate with other open browser windows. In a preferred embodiment, the user's connection to the PPP enhanced Wallet 215 is through the Internet. In an alternative embodiment, the connection from the user's workstation 200 to the PPP enhanced Wallet 215 software can be through a separate dial up line or third party private network.

As one of its primary functions, the PPP enhanced Wallet 215, though the functions provided by the PPP 227 serves as the portal to an Internet Payment Account (IPA) or a DDA account 230 described in more detail below. In a preferred embodiment the PPP enhanced Wallet 215 stores the following types of information: Form filling information such as credit card numbers, debit card numbers, shipping addresses, alternate shipping addresses, frequent flyer accounts, membership discounts (e.g., AAA, AARP), loyalty programs and e-mail addresses; Discount information such as e-coupons, rebates and merchant-specific spending certificates; Points or miles accrued for use of the accounts associated with the PPP 227; and Convenience information such as frequently paid VPL#'s (described below), bill payment account#'s, receipts, e-commerce bookmarks, shopping lists. A preferred download folder is installed on the user's local hard drive. The PPP enhanced Wallet 215 has pull down menus that are used to select, edit, update, sort, import and export any of the above information.

Using the above information, the PPP enhanced Wallet 215 automatically fills in electronic merchant purchase forms with the user's shipping address, e-mail address, discount numbers, etc. The PPP enhanced Wallet 215 supports virtual cash (IPA/DDA) payments in accordance with the present invention, traditional credit and debit card "pull" payments and a combination of the two types of payments as is further described below. Upon receipt of an electronic purchase message from a merchant web site 255 as will be further described below with respect to the method of FIG. 2, the PPP enhanced Wallet 215 user is able to: 1) approve a purchase; 2) initiate the payment through a payment authorization to the consumer's bank 220; 3) verify the accuracy of the merchant's payee information (identification of the merchant's account 235 at the merchant's bank 275); 4) generate a purchase confirmation 244 that is transmitted to the merchant web site 255 or VPL reporter 240; and 5) generate a receipt that can be stored at the server hosting the PPP enhanced Wallet 215 or the user's storage (e.g., hard drive) on workstation 200. The PPP enhanced Wallet 215 user receives a confirmation message indicating that no purchase has been made if a purchase is not completed.

The PPP enhanced Wallet 215 includes a "Time Out" feature whereby purchase requests not approved by a user for a set amount of time (e.g. 10 minutes) will be invalidated. For "Pay Anyone" payments as further described with respect to FIG. 3 below, the PPP enhanced Wallet 215 supports a user defined recission period (e.g., 30 minutes) during which the user can reverse a transaction.

An additional feature of the PPP enhanced Wallet 215 are parental control settings. In establishing an IPA account, the user is given the opportunity to establish subordinate (child) IPA and/or VPL accounts that are controlled by the main (parent) IPA account. For example a parent might want to establish an IPA/VPL account for each of its children. Through the IPA account linked to the parent's PPP enhanced Wallet 215, the parent is able to view and control all aspects of the children's IPA/VPL accounts. For example, the parent might limit the funding of the children's accounts such that they can only receive funds from the parent's account. This will prohibit strangers from sending money the children's accounts. The parent could also limit the amount or number of any transactions out of the account or limit (block) any payments to unapproved VPL accounts (e.g., associated with unapproved Internet sites)

Using functionality from online banking services, the PPP enhanced Wallet 215 is able to be associated with (linked to) some or all of the accounts maintained by the user at the bank 220. The user is thus able to transfer funds, amounts, value, from one account to another (e.g., to an IPA account 230 from a savings account, or VPL account 235) with ease. Although in the preferred embodiment of the present invention, the IPA 230 and VPL accounts are maintained at a financial institution (e.g., a bank), it is readily appreciated that any businesses that can attach to the EFT network 270 are capable of maintaining the accounts 230, 235 and performing the operations of the present invention.

A unique transaction number is included in any payment communications to and from the PPP enhanced Wallet 215. All of the payment communications are stored by the PPP enhanced Wallet 215 for review and auditing by the user. Examples of stored payment communications include payment messages from a merchant or billers, payment authorizations from the PPP enhanced Wallet 215 to the bank 220, and payment confirmations 244 to the merchant (255 or 240). The transaction number for a particular transaction is included in each communication and allows for swift correlation and indexing of communication records (e.g., reconciliation). The PPP enhanced Wallet 215 interfaces with the Account Reporter described below, which will have access to all archived transactions. In a preferred embodiment, the payment communication records are stored in a common database and both the PPP enhanced Wallet 215 and the Account Reporter associated with (attached to) a particular accounts are able to access the common database for these accounts. Transactions are stored for audit as well as disaster recovery purposes. The PPP enhanced Wallet 215 allows the user to view all transaction histories including receipts and messages. These historical items are sortable by date, function (bill payment, pay anyone, shopping, etc.), amount, payments initiated or received, merchant, etc.

As is further described below, the PPP enhanced Wallet 215 is responsible for initiating the push of the credit to the merchant's account 235. In order to perform the credit push over the EFT, the PPP enhanced Wallet 215 requires the merchant's payee information that uniquely identifies the merchant's Virtual Private Lockbox (VPL) 235. This payee information includes the merchant's bank 275 identification number (typically six digits) and the number of the VPL account 235 (typically ten to thirteen digits). This payee information constitutes an address to which the Wallet 215 can push credits. Payment communications from PPP enhanced Wallet 215 can additionally identify the PPP enhanced Wallet 215 user's name (if required) and include the unique transaction number. The PPP enhanced Wallet 215 can make repeated payments (daily, weekly, etc) as well as scheduled payments (on a specific calendar day or in a specific # of days). If the PPP enhanced Wallet 215 is linked to a DDA account, DDA debits such as checks, returned checks, ACH payments, etc. are not charged against funds in the primary IPA account 230 associated with the PPP enhanced Wallet 215. Users are required to acknowledge acceptance of a PPP enhanced Wallet 215 agreement prior to their first transaction using the PPP enhanced Wallet 215 including a requirement to return any proceeds received in error.

Prior to conducting any on-line purchases or making any payments using the methods of the present invention, the consumer establishes an Internet Payment Account (IPA) 230 with its bank 220. Alternatively, a DDA account 230 can be used, but this is less preferable. For one reason, it is envisioned that only small payments are to be made from the IPA account 230 and accordingly less funds would be kept in the account as opposed to the funds normally maintained in a DDA account.

The IPA account 230 is a specialized account used specifically for electronic commerce in accordance with the present invention. Once the IPA account 230 has been established, the user is able to fund this account 230 from its normal DDA checking or savings accounts, consumer's Line of Credit, or credit, or debit card account held by the bank 220 or any other account from which the consumer can transfer funds (e.g., another DDA account or credit card account at another financial institution). The IPA account 230 provides the user with a confirmation capability in order to verify that the amount drawn is correct. The IPA account 230 and the VPL account 235 (described below) both allow PIN debit transactions for withdrawals from the accounts.

In a preferred embodiment, the IPA account 230 is combined with a VPL account 235 into a single account. The IPA account functionality is accessed through a first address to the account by which funds can be transferred out of the IPA account. Only the user has access to this address and it is password and or PIN protected. If the user has several IPA accounts, when the user accesses its PPP 227, a single password and or PIN procedure provides access to all of the user's accounts. The VPL functionality makes the single account appear as a receive only account and is accordingly accessed through a second, preferably different address. This second address can only be used for receipt of credits, preferably electronic credits according to the present invention. Since the second address can only be used to receive funds, the user can freely publish the address without any fear of someone fraudulently transferring money out of the account. The VPL portion of the account can be accessed for PIN debit transactions as will be further described below in connection with the physical card embodiment of the present invention (see FIG. 4)

The establishment of a separate IPA/VPL account 230 for electronic credits and payments is preferable from a user's point of view in order to provide a separate accounting from the user's normal DDA. As with its regular accounts, a transaction history for the IPA 230 is archived. As the IPA account 230 is not necessarily interest bearing, it is envisioned that the user would accordingly only fund small amounts into this account in order to cover potential on-line purchases. The user can set up periodic (e.g., weekly) automatic funding of the IPA account 230. In an alternative embodiment of the present invention, the user's payments in accordance with the present invention may be made directly against a normal DDA account.

The IPA 230 or VPL 235 accounts can have physical companion card for physical, in person, purchases and withdrawals as will be further described below with respect to FIG. 4. Each of the IPA 230 and VPL 235 accounts allow physical access via ATM's or merchant card readers for PIN debit transactions.

One of the most significant features of the present invention is the use of the existing EFT networks 270. Although these networks 270 have provided secure transfer of funds for years, the use of these networks in accordance with the present invention is heretofore unheard of. In the use of the EFT network, the present invention provides real time credit. This is contrasted to the prior art debit message methods in which the only semblance of credit provided in a reversal of a prior debit transaction (e.g., credit cards). The EFT networks 270 are used to effect IPA transactions, fulfill IPA reporting functionality, and can be used to fund the IPA 230. As well as supporting the transmission of real time credit messages, the EFT network 270 transmits messages containing special transaction codes and account and bank number structures (addresses) used to uniquely identify IPA transactions. Furthermore, the EFT network 270 can be used to verify the existence and validity of destination accounts as further described below.

As described above, similar to an IPA account 230, the Virtual Personal Lockbox (VPL) 235 is a limited function account. While an IPA 230 can be accessed electronically for outgoing payment transactions, a VPL 230 is constructed with EFT network "receive only" functionality. This feature of a VPL account (or a VPL address for a dual access IPA/VPL account) provides a merchant (or other party) to receive electronic credits (e.g., payments) through the EFT 270. In this manner a VPL 235 is a secure address that can be provided to the public as a means of receiving funds. Once received by a VPL account 235, funds can then be manually or automatically swept by the merchant's bank 275 to one of the owner's other accounts 280 (e.g., a DDA or cash concentration account 280). This sweep can be performed once a day, or more or less than once a day as dictated by the needs and objectives of the VPL user.

Like an IPA account 230, the VPL 235 can have a physical companion card for physical, in person, purchases and withdrawals. The VPL 235 can allow physical access via ATM's or merchant card readers for a PIN debit transaction using a user only access (address) for debit transactions from the VPL 235. Although providing the general function of an account (to hold funds), it must be repeated that the basic functionality of a VPL 235 is distinct from the IPA account 230 functionality. The VPL 235 is a secure lockbox into which funds can be transferred but cannot be taken out (except during the sweeping process or other PIN transactions described herein).

Figure 3:
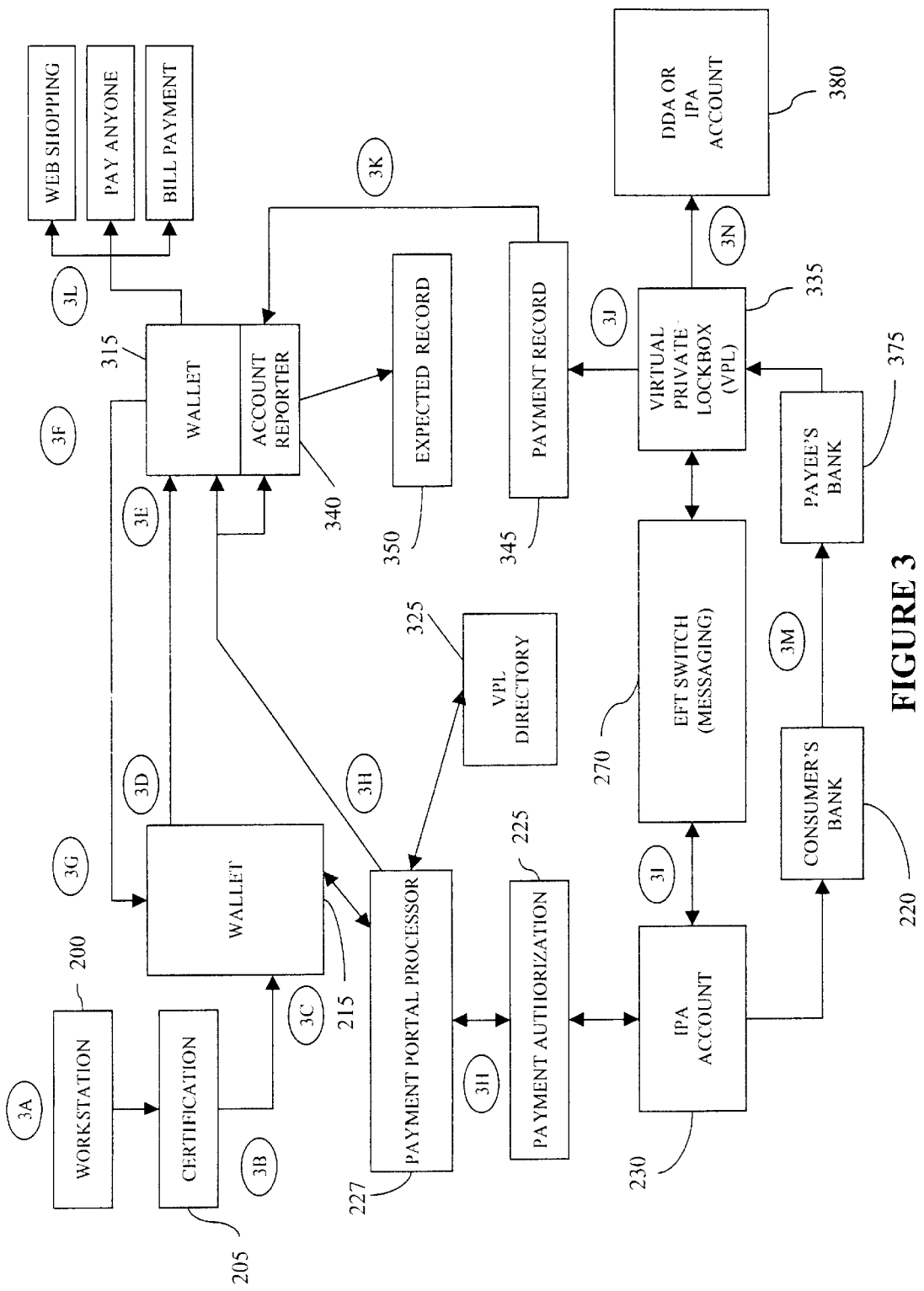
FIG. 3 depicts a pay anyone embodiment of the present invention.

In preferred embodiment of the present invention, VPL addresses for various merchants and other receivers of electronic payments are made available in a public directory 325 (see FIG. 3). Since the 'receive only' address of a VPL account 235 is what is published in the public directory, merchants and other users of the 'receive only' VPL 235 are alleviated of the fear of the fraud. In the preferred embodiment, the directory of VPL addresses 325 is maintained on an Internet accessible server or servers and accessed through a website that provides the capability to search and select and retrieve VPL information. Alternatively, the directory 325 can be accessed by PDA, kiosk or by phone using voice recognition or other telephony technology. The directory 325 can be used by the PPP enhanced Wallet 215 to verify the accuracy of a VPL address before it commits to transferring a credit message to the account designated in the VPL address.

As described above, the address for an IPA 230 or VPL 235 consists of an identification of the institution at which the account is held (typically six digits) and an identification of the account (typically ten to thirteen digits). For consumers (the "white pages"), the directory 325 contains but is not limited to the VPL address, the last and first name of the VPL consumer, the user's Post Office address, phone and email address. For businesses (the "yellow pages"), the directory 325 contains but is not limited to the VPL address, the business name, the industry or type of business, the business' Post Office address, phone and email address.

As briefly described above, the Account Reporter 240 is a portal to view the VPL account 235. The Account Reporter 240 provides online, real-time transaction reports, and reconciles accounts receivable/purchase records 250 against incoming EFT payment records 245. Although primarily intended for use by merchants, much of the functionality of the Account Reporter 240 is incorporated in the PPP 227 Wallet 215. The PPP 227 preferably include a base set of requirements for consumers, and the Account Reporter 245 would contain added features required for merchants and businesses (e.g., reconciliation of purchase records and payment records).

The VPL account 235 updates the Account Reporter 240 as payment records (credit messages) and transaction numbers are received through the EFT messaging system 270. At the same time, any purchase orders 250 (in the form of a record) and payment confirmations (see below) are passed to the Account Reporter 240 from merchant and billing web sites. As seen in FIG. 2, the Account Reporter 240 is also capable of receiving purchase confirmations 244 from the PPP 227. Purchase confirmations 244 and payment records 245 are retrievable, in real-time, from the Account Reporter 240. Account Reporter 240 users are able to view their records with respect to their VPL accounts 235 on the Internet. Although only one VPL account 235 has been illustrated in FIG. 2, it is understood that a merchant is able to simultaneously maintain several VPLs 235. Each of these VPLs 235 is capable of being accessed and viewed by the single Account Reporter 240, much like a consumer is able to associate several IPA/VPL accounts with its PPP 227 and is able to view these accounts using the PPP 227.

In addition to the functionality described above with respect to the base features of the Account Reporter 240 (storing, reviewing, sorting transaction histories), a merchant embodiment of Account Reporter 240 includes additional functionality. A first of the additional functions provided by the merchant Account Reporter 240 is its reconciling capability that matches purchase requests 250 generated by the merchant's website 255 with shopper's purchase confirmations 244 and the EFT payment records 245. Any items that do not match are flagged by the Account Reporter 240 as exceptions for review. The merchant Account Reporter 240 further provides for identification (ID) and password security, offering varying levels of access authority to the users.

Additionally, the merchant Account Reporter 240 automatically updates the merchant's accounts receivable, inventory & fulfillment files. As a further extension, Account Reporter 240 also has fulfillment service capabilities whereby information from a merchant's website 255 is consolidated and communicated to a warehouse to initiate product shipment 260, as well as linked to United Parcel Service (UPS™), Federal Express (FedEx™), or other shipping services for shipping execution. The Account Reporter 240 contains essential customer service tools such as the ability retrieve/review electronic purchase orders/payments real time, and in turn the ability to email or autofax copies of such directly to customers. The Account Reporter 240 further provides data mining tools that collect statistics on buyer/shopper behavior, track seasonal and regional buyer/shopper trends, and track other key demographics. Based on these statistics, merchants can issue focused, customized electronic coupons through their Account Reporter 240.

In one embodiment of the present invention, the user of an IPA account 230 can specify whether or not the credits it pushes from the IPA includes any identification information at all (e.g., account number, name . . . ) One of the features of the electronic credit pushes of the present invention is that the credit pushes can be made completely anonymously, with the recipient of the credit having no way to determine from where the credit originated. The recipient of the credit is able to match the received credit with a proposed purchase using a transaction ID that is contained in the EFT credit push. In the Internet shopping embodiment described below, the Internet merchant provides the buyer with the transaction ID and the buyer includes the transaction ID in the EFT credit message sent to the Internet Merchant's VPL account.

If the user is less concerned with privacy, the user can include a partial or complete identification of itself in the credit push. If the credit push received by a VPL 235 does contain some identification information, the Account Reporter 240 can be configured such that the identities of individual buyers will not be available to the Account Reporter 240 without the prior consent of the user who initiated the credit to the VPL 235. For consumers, the Account Reporter 240 appears as a seamless part of the PPP 227, while for merchants and businesses, the Account Reporter 240 appears as a separate utility.

Merchant Web sites 255 are well known to those skilled in the art. Merchant Web sites 255 typically include code (such as HTML, XML, or ECML) for getting transaction BIN statements (payment messages) to the Wallet 215. As further described below these payment messages typically contain the merchant's VPL 235 address which includes the address of the merchant's bank 275. The payment messages enable the consumer to push a credit from its IPA account 230 through the EFT system 270 to the VPL account 235. Merchant's websites 255 can provide a hotlink on the shopping site 255 that goes directly to shopper's PPP enhanced Wallet 215.

Having described the structural elements of the present invention, the following discussion illustrates an embodiment of the present invention related to Internet shopping. As in all of the remaining FIGS. 2–9, the method steps are illustrated in the Figures in small circles next to the structural element most closely related to the action being performed. In this embodiment, the consumer (user) initiates the process in step 2A by logging onto the Internet, launching the Browser 210 and selecting the PPP enhanced Wallet 215 icon from Browser 210 toolbar. The PPP enhanced Wallet 215 does not have to activated until the user actually wishes to buy something, but the PPP enhanced Wallet 215 could also contain lists of links to a user's favorite shopping sites (or billing sites as is further described below).

In step 2B, the user completes a certification procedure 205 in order to correctly identify him or herself to the PPP enhanced Wallet 215. Typically the certification process involved the user keying in the user's ID and password on the keyboard associated with the workstation 200. The user is thus authenticated and has access to their PPP enhanced Wallet 215. In step 2C, the user is then presented with balance information with respect the IPA accounts 230 associated with the PPP enhanced Wallet 215 and can select from several options. In a preferred embodiment the options presented to the user include: Shop on the Web; Pay Anyone (see FIGS. 3 and 5); Fund Accounts (see FIG. 9); Pay Bills (see FIGS. 6–8); and View Account Activity.

Assuming the user has selected the Shop on the Web option in step 2D, the Browser 210 could be initially directed to special website list of approved merchants (which can also contain the VPL addresses for such merchants). Alternatively, the user is free to navigate the Internet to the merchant web site of their choice. In step 2E, the user has found a website 255 of a particular merchant and more specifically has found and selected an item for purchase from merchant web site 255. Since the PPP enhanced Wallet 215 is active, the merchant's site 255 recognizes user as a PPP enhanced Wallet 215 customer. In response to this recognition, all of the purchase fields (shipping address, name, etc.) required by the merchant site 255 are automatically populated from the PPP enhanced Wallet 215 as described above. Alternatively, the user can sign on to their PPP enhanced Wallet 215 after the user has found an item at a website for purchase. The user can either invoke the PPP enhanced Wallet 215 by clicking on an icon embedded directly into the merchant's web page 255, or by clicking on a wallet button on the Browser 210 toolbar.

In step 2F, the merchant site 255 generates and transmits to the user a bill payment message containing information with respect to the prospective purchase. The information provided by the website 255 in the bill payment message includes but is not limited to the following data: Merchant BIN; Merchant Account#; Transaction ID; and the Dollar Amount of the transaction. In step 2G the bill payment message is received by the Wallet 215 window. A window displays the bill payment message for review by the user. If the user changes his or her mind, the user can select a button on the window entitled Decline Purchase. If the user does want to complete the purchase, a Purchase Item button is selected. Although described above with respect to a single item, it is clear that the above process equally applies the shopping cart method employed by most merchant sites 255.

In the shopping cart method, after the customer has selected a number of items to purchase, the merchant site 255 totals the items and transmits a consolidated payment message to the PPP enhanced Wallet 215 in step 2F.

If the user has selected to purchase the item pursuant to the bill payment message from the merchant site 255, the PPP portion 227 of the PPP enhanced Wallet 215 in step 2H first verifies the user's balance in the primary IPA account 230 associated with the PPP enhanced Wallet 215. If there are insufficient funds in the IPA account 230, the user is asked if he/she would like to transfer funds from another account into the IPA account. Using online banking procedures, the PPP enhanced Wallet 215 is able to transfer fends from any account accessible by the PPP enhanced Wallet 215 into the IPA account 230. If there are sufficient funds in the IPA account 235, the PPP 227 generates a payment authorization message for transmission to the bank 220. The payment authorization message 225 contains the above described payee information (merchant VPL account and bank address) and can also contain a user defined memo field for entry of any information desired by the user (e.g., "payment for new mystery book").

In addition to generating and transmitting the payment authorization 225, the PPP 227 transmits a purchase acknowledgement directly to the merchant's website 255. Typically, in response to this purchase acknowledgement from the user's PPP 227, the merchant's website 255 creates a purchase record 250 in a database (not shown) for future use in reconciling with the actual payment confirmation 244 and/or payment record 245. As illustrated in FIG. 2, the PPP 227 also send a payment confirmation 244 either to the website 255, or the merchant's Account Reporter 240. In the preferred embodiment, the payment confirmation 244 is in the form of an electronic message (e.g., an E-mail) to the Account Reporter 240. The payment confirmation 244 can be sent either before or after the PPP 227 has actually transmitted the payment authorization 225 to its bank 220, without any confirmation from the bank 220 that the payment was actually transmitted via the EFT network 270. Alternatively, the PPP 227 can wait until it has received confirmation from the bank 220 that the EFT credit message was actually sent through the EFT network 270.

In the preferred embodiment the banks 220, 275 which maintain IPA 230 and VPL accounts 235 also maintain the above described database that is used as a centralized record keeping archive in order to feed and retrieve transaction data. Such transaction data includes but is not limited to payment authorizations 225, payment confirmations, and the records required for the Account Reporter 240 including EFT transaction data.

In addition to the payment acknowledgment sent to the merchant's website 255, and the payment confirmation sent to the Account Reporter 240, the PPP 227 transmits the payment authorization 225 to the user's IPA account 230 to effectuate the actual transference of the funds from the user's account 230 to the merchant's account 235 via an EFT credit message on the EFT system 270. The consumer's bank 220 will require some form of authentication of the payment authorization from the PPP 227. This authentication can be in the form of a software certification, an encrypted PIN, or the mother's maiden name of the consumer. Once the bank 220 has authenticated that the message truly originated from the consumer, the bank 220 can then fulfill the payment authorization 225.

Upon receipt of this authorization for payment 225, in step 2I, the user's bank 220 debits the user's IPA account 230 to generate an EFT credit message in the amount of the authorized payment. As described above, the EFT credit message is completely different from traditional EFT messages that are debits or the reversals of debits. Once generated, the EFT credit message is transferred to the merchant's VPL account 235 via the ATM switch 270. Although the credit instruction is illustrated in FIG. 2 as being processed directly by the accounts 230 and 235, it is appreciated that the records are actually processed by the messaging systems and processors of the user's bank 220, the merchant's bank 275 and the EFT network 270. The EFT credit message is essentially a guarantee of payment from the user's bank 220 (the funds being debited from the user's account 230) to the merchant's bank 275 (the funds being credited to the merchant's account 235). Settlement between banks 220 and 275 typically occurs once a day with respect to all outstanding credits and debits between the banks 220, 275, although the cash is available from the VPL account 235 upon receipt of the EFT credit message.

After the EFT credit message has been received by merchant's VPL 235, the receipt of the credit is detected by the merchant's Account Reporter 245 (step 2J). In response to the detection of the credit, the Account Reporter 240 preferably generates and stores a payment record 245 in the same database in which the purchase record 250 was stored in step 2H described above. Although only a single payment record 245 has been illustrated in FIG. 2, it is appreciated that two payment records 245 can exist for a single payment transaction. The first payment record 245 can be generated upon the receipt of the payment confirmation 244 from the user's PPP 227. The second payment record 245 can be generated upon the actual receipt of the EFT credit over the EFT system 270.

Once the payment record 245 has been stored, it can be reconciled by the Account Reporter 240 against the merchant's purchase record 250 (step 2K). In this manner, the accounting loop in the merchant's system can be closed, with the matching of the merchant's invoice (the purchase record 250) with the payment (the payment record 245). Alternatively, the Account Reporter 240 can reconcile the above described two payment records (one generated from the payment confirmation and one generated from the EFT credit message) against the purchase record 250. With Account Reporter 240, a merchant has a product that allows for secure transaction fulfillment, reconcilement ability, record-keeping and archive possibilities. Once the financial loop has been-closed with the receipt of the payment record 245 by the merchant, the merchant can confidently ship the goods 260 to the consumer in step 2L. Shipment of the goods can entail physical shipment of a physical good, or electronic transmission of a digital good such as a music file.

In fulfillment of the guarantee established by the EFT credit message, funds are settled once a day in step 2M between user's bank 220 and the merchant's bank 275 through the EFT switch 270. Typically, hundreds or thousands of such payments occur back and forth between bank 220 and bank 275 during the day and for efficiency purposes, the actual net funds due from one bank to the other are only transferred once per day. For example, one bank 220 might have guaranteed $10,000 in EFT credit messages from one hundred of its customers to the other bank 275. On the same day the other bank 275 might have guaranteed $12,000 in EFT credits from fifty of its customers to the other bank 220. At the end of the day, bank 275 only sends the difference, $2,000, to bank 220 and each of the banks 220, 275 ensure that the proper accounts in its own bank are debited and credited for the payments. As can be readily appreciated each bank performs this end of day settlement with hundreds of other banks, as is presently done with the current ATM system 270 transfer of funds. Again on a daily basis, the funds received into the merchant's VPL account 235 are swept by an automatic process into the merchant's cash concentration account 280, which can be a DDA or IPA account.

As is readily appreciated from the above description, the PPP enhanced Wallet 215 and the Virtual Private Lockbox (VPL) 235 significantly enhances the consumer and merchant experience when used for web shopping. The present invention completely solves one of the biggest problems of the prior art, the hesitancy of a consumer to provide financial account information over the Internet. Rather than the merchant "pulling" in the consumers account information and requiring authentication of the consumer, the PPP enhanced Wallet 215 "pushes" an EFT credit message to the merchant's Virtual Private Lockbox, without the merchant ever obtaining the consumers account information. This transaction is virtually instantaneous, provides privacy, security, and convenience to the consumer—and guarantees funding, provides reconcilement, and supplies archival records to the merchant.

With respect to authentication, because the consumer is pushing the payment to merchants or other entities or individuals, rather than the merchants pulling payments from consumer accounts, the consumers do not need to authenticate themselves to the merchant. Rather, the consumers authenticate themselves to their own bank 220, which then executes the EFT credit payment to the merchant's VPL account 235.

This method of the present invention is quite attractive to consumers because they can pay any merchant regardless of the existence of a pre-existing relationship with that individual or entity. The transaction can furthermore be conducted from anywhere there is access to the Internet. The IPA account 230 can be used and managed through the consumer's PC, a web enabled ATM, by phone or by any other web enabled device. The present Internet shopping payment method is extremely easy for online banking customers to adopt. The method allows consumers to conduct online shopping without having to provide any personal confidential financial information to unknown merchants. The method allows consumers to conduct these financial transactions solely with her or his own financial institution.

With respect to merchants that are paid by the method of the present invention, there are several advantages. This method opens up a universe of buyers/payors who do not have access to or the desire to use credit or debit cards online. Very little effort is required on the part of a merchant which only has to publish its bank 275 and VPL deposit only account 235 information on its web site 255 or other public directory (see 335 in FIG. 3). If a merchant has been using traditional credit card methods, the present invention provides the merchant with significant savings in credit card processing, repudiation costs, fraud loss, and chargeback costs. The present invention also provides the merchant with the ability to economically accept micropayments.

FIG. 3 illustrates a second embodiment of the present invention in which the structures described above can be used by a user to pay anyone. The PPP 227 of the present invention provides the user with tremendous flexibility. Anyone with using a PPP 227 can conveniently send funds to anyone else with an IPA/VPL account. This funds transfer is instantaneous and at no cost to the consumer, and is conducted in a secure environment.

As described above with respect to the Internet shopping model illustrated in FIG. 2, in the pay anyone model of FIG. 3, in steps 3A–3C, the user logs onto the Internet, launches its browser (not shown in FIG. 3) and launches the Wallet 215. In the embodiment of FIG. 3, the Wallet 215 is a traditional Wallet with the appropriate interface to the the PPP 227. When the user wants to activate the PPP 227, the user is required to key in its user ID and password, by which the user is then authenticated and has access to their the accounts 230 associated with the PPP 227. The user is then presented with its account balance information and can select from several options including Shop on the Web, Pay Anyone, Pay Bills, Pay Anyone, Fund Wallet, Review Account Activity, Edit Wallet information, or Go to Customer Service.

In the present embodiment illustrated in FIG. 3, the user selects the Pay Anyone option from the menu and the user is presented with several options in the Pay Anyone menu screen in step 3D. These options include: manually keying in the payee's VPL number; selecting a prior payee from a drop down menu; Add/Remove/Edit a payee from drop down menu; and the option to go to an online directory (325) of VPL numbers of various payees. In the particular embodiment illustrated in FIG. 3, the user keys in (or selects) the payee's VPL address, the dollar amount of the payment, and a description of the reason for the payment, the description being optional.

In step 3E, the above described payment information is transmitted to payee's Wallet 315 (or PPP 227, not illustrated). The payee's Wallet 315 verifies the VPL number specified by the user and provides an authorization to make the payment. In step 3F, the payee's Wallet 315 confirms that the information is correct and transmits to the user (payor) a payment message with the following data: Payee BIN; Payee Account#; Transaction ID; the dollar amount of the payment; and an optional description. In step 3G, upon receipt of the payment message, the user reviews the message and selects "OK to Pay". Step 3D through 3G are an optional process since the PPP 227 can unilaterally initiate the push of an EFT credit message without ever having contacted the receiver of the credit. In such a blind push of a credit it is recommended that the PPP 227 consult an online directory 325 to verify the accuracy of the address to which the EFT credit message is to be sent.

In step 3H, the user's PPP 227 sends the payment authorization 225 to the user's IPA account 230. In parallel, the user's PPP 227 transmits a payment confirmation of the expected payment to the payee's Wallet 315 or Account Reporter 340 which creates an expected payment record 350. The user's PPP 227 goes through the certification as described above in order for the user's bank 220 to properly identify the payment authorization 225. In step 3I, the EFT credit message is passed from user's IPA account 230 to the payee's VPL 335 via the ATM switch 270. As described above, the payee's VPL 335 may actually be the receive only address of an IPA account maintained by the payee.

In an alternative embodiment, a verification message is first sent though the EFT network 270 to the destination account 335. The purpose of this verification message is to verify the existence and identity of the VPL account 335. In response to the receipt of the verification message (assuming the VPL address was accurate and the message was received), the VPL account sends back a response message that includes a text description of the owner/user of the VPL account 335. This response message is then displayed to the user via the PPP 227 so that the user can verify that the account 335 to which it is about to send a credit is actually owned/used by the party to which the user intend to send the credit.

This verification procedure can be used in the Internet shopping model described above with respect to FIG. 2. In fact, the verification procedure is useful in thwarting any attempts at hacking of the VPL address transmitted (step 3F in FIG. 3 and step 2F in FIG. 2) via the Internet in the payment message from the merchant (255 in FIG. 2) or other payee (represented by Wallet 315 in FIG. 3). For example, if the payment message originated from Amazon™ and included Amazon's VPL 335 address, the verification procedure described above through the secure EFT 270 network would inform the user that the owner of the VPL 335 was truly Amazon. If a miscreant (e.g., Joe Hacker) had intercepted the payment message and inserted its own VPL address, the response message in accordance with the verification procedure will visually inform the user that the VPL address to which it will send the credit is owned by Joe Hacker. At this point the user can abandon the transmission of the EFT credit and try and identify Amazon's true VPL address.

In an alternative verification procedure, the PPP 227 can echo back to the sender of the payment message (merchant 255 in FIG. 2 or Wallet 315 in FIG. 3), the VPL address contained in the payment message. The sender can then verify for itself that the user has the correct VPL address to which to send the credit. This alternative verification process requires the hacker to intercept and alter two separate messages. Although better than no verification, the alternative procedure is still not as attractive as the EFT network 270 verification as it occurs in the unsecured Internet space.

Returning to FIG. 3, in response to the receipt of the EFT credit message by the payee's VPL 335, a payment record 345 is generated (step 3J). Upon the receipt of the payment record 345, the payee's Wallet 315 or Account Reporter 340 in step 3K is able to reconcile the expected payment record 350 against the actual payment record 345. Further in response to the receipt of the EFT credit message, the payee bank 375 credits the payee's VPL account 335 and the payee now has immediate use of funds. These funds can in turn be used for web shopping, bill payment, pay anyone, or can be withdrawn at an ATM using the card feature described below.

In concluding the pay anyone process, as with the embodiment illustrated in FIG. 2, funds are settled once a day between the user's bank 220 and the payee's bank 375 (step 3M), and the funds can be swept into the payee's DDA or other IPA account 380 (step 3N).

The pay anyone process described above is a very attractive payment method for consumers. For example, the consumer might be responding to a classified advertisement (electronic or traditional paper) or purchasing an item or a service through an electronic auction site such as eBay™. In either of these cases, the consumer can obtain the payee's VPL account 335 information (e.g., BIN, account number . . . ) in a variety of ways. In one method, the consumer obtains this information electronically from the service where it contacted the individual (e.g., through eBay™). Alternatively, the consumer can obtain the necessary destination account information through offline methods such as the traditional paper classified advertisement or through an Email which has been "pushed" to the consumer by the potential payee. The potential payee is protected using these methods since the VPL account 335 is a receive only account and no one can access the account to fraudulently withdraw money from the account. The user can furthermore obtain the payee information from the online directory 325, from a pull down menu on the Wallet 215 or by keying in the information manually.

Figure 4:
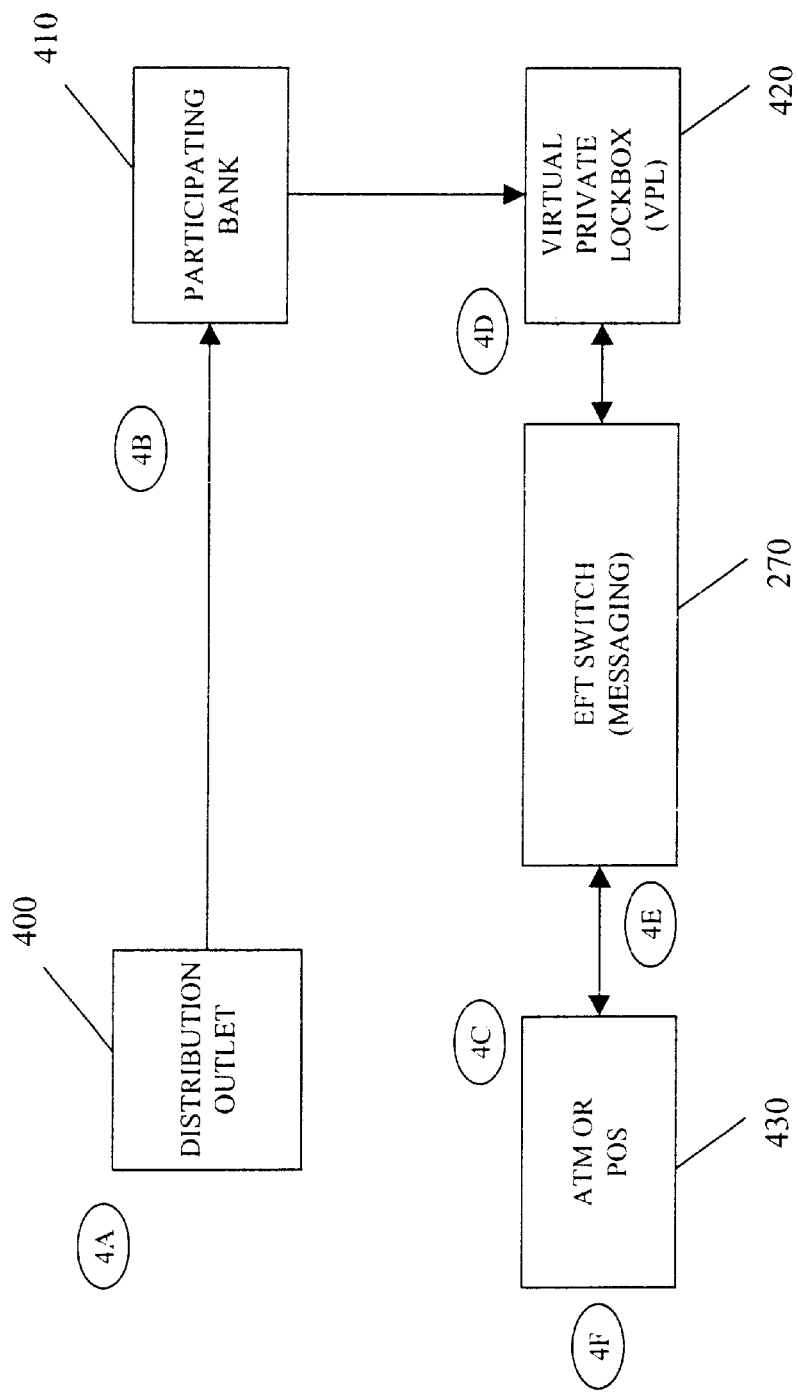
FIG. 4 illustrates a prepaid cash card embodiment of the present invention.

FIG. 4 illustrates an embodiment of the present invention involving a physical card associated with a VPL or IPA account. In this embodiment, the physical cards are linked to IPA or VPL accounts containing an initially established pre-set amount of cash. The card is issued to the IPA or VPL account user in order for the user to access the IPA or VPL account in the physical world. Furthermore, the cards can be purchased at vending machines placed in convenient e-commerce locations or other distribution outlets such as at the mall, convenience stores, or banks. In a preferred embodiment, when a user establishes a traditional Wallet 215, the user is offered an option to establish an IPA/VPL account, receive a PPP enhanced Wallet 215, and receive a physical card associated with the IPA/VPL account. Upon selecting this option, the card is mailed to the IPA/VPL user.

In the vending machine embodiment, the card is purchased from the vending machine with pre-funded with set increments of currency. These increments are associated to specific account number ranges, and are linked to IPA/VPL accounts. In one embodiment, the physical card is pre-activated (i.e., ready for immediate use). Alternatively, the card can be automatically activated upon its disbursement from the machine, or by the consumer making a toll-free call to a customer service line, or activated upon the user's first use of the card. The purchase of a card at a vending machine establishes a IPA/VPL account for the purchaser. As an alternative to the preset association of a card to an account and dollar amount, the association of the card to the account and the funding of the account can be accomplished dynamically as the user is purchasing the card.

Once purchased, the cards can be accepted at ATM's and merchants that are outfitted with card readers. Since the cards are PIN protected, they are safer than cash. The card has the IPA/VPL account number as well as a PIN. The PIN is printed on a sticker affixed to the back of the card when the card is issued. The account number is stored on the magnetic stripe on the back of the card. The VPL portion of the account associated with the card can receive EFT credits as described above and can funded from other accounts as also described above. The card can be used to withdraw funds at an ATM and make purchases from any merchants that accept debit cards.

For card purchased by someone who did not previously have a IPA account, in order to subsequently use EFT credit pushes as described above, the card owner will be required to establish an IPA account with the sponsor of the card. For example, if the sponsor was a bank, the user signs onto bank's website, the new card owner keys in the card number and PIN to synchronize the VPL with a newly created IPA account for the user. This synchronization will add the IPA account to the card link. The user can then specify against which account portion, IPA or VPL, debits will be made when using the card. The user will also be asked to indicate whether any funds received by the VPL will be swept to the newly created IPA or to an existing DDA account.

One specific embodiment purchasing and using a physical card is illustrated in FIG. 4. In step 4A, the purchaser selects a card from either a vending machine 400 or a vending enabled ATM (not shown) or other distribution outlet. In a preferred embodiment, cards can be purchased for as little as a $1, or in larger ATM-like increments. After making a selection, the purchaser is prompted to pay for the card. Several purchasing options are available, including cash, debit cards and credit cards.

In step 4B the card is disbursed from the machine 400 with a pre-assigned PIN as well as instructions for using the card. The card is either pre-activated or alternatively, the dispensing machine 400 sends an activation message to the card sponsor upon its purchase, or the card is activated upon its first use, or the user can phone in to activate the card. The distribution outlet (e.g., vending machine) also provides the purchaser with a printed receipt that can be used in the event that the user loses the physical card.

With the card in hand, the user is able to withdraw funds from the account associated with the card or making store purchases using the card. In step 4C, the card owner inserts the card into an ATM machine 430 or a merchant card reader at a merchant's Point Of Sale Location. The user then keys in the PIN number to identify her or himself as the proper owner of the card. In step 4D the merchant's card reader, which is connected to the EFT network 270, transmits a debit message through the EFT switch 270 to the sponsoring bank 410:

As similarly depicted in FIG. 2, the debit message is seen as being received directly by the user's VPL account 420, but in practice, it is realized that all EFT messaging occurs through the systems of the bank 410. The message is transmitted to the bank 410 as an online PIN debit transaction against the user's VPL account 420. Upon verification that there are sufficient funds available in the VPL account 420 associated with the requesting card, the transaction is authorized by the VPL sponsor 410 and the funds are deducted from the balance in the VPL account 420. In step 4E, the authorization message is transmitted back to the ATM or POS 430 through the same EFT network 270 and the funds are released to the card owner (in the case of an ATM withdrawal) or credited to the merchant (store purchase) in step 4F.

Figure 5:
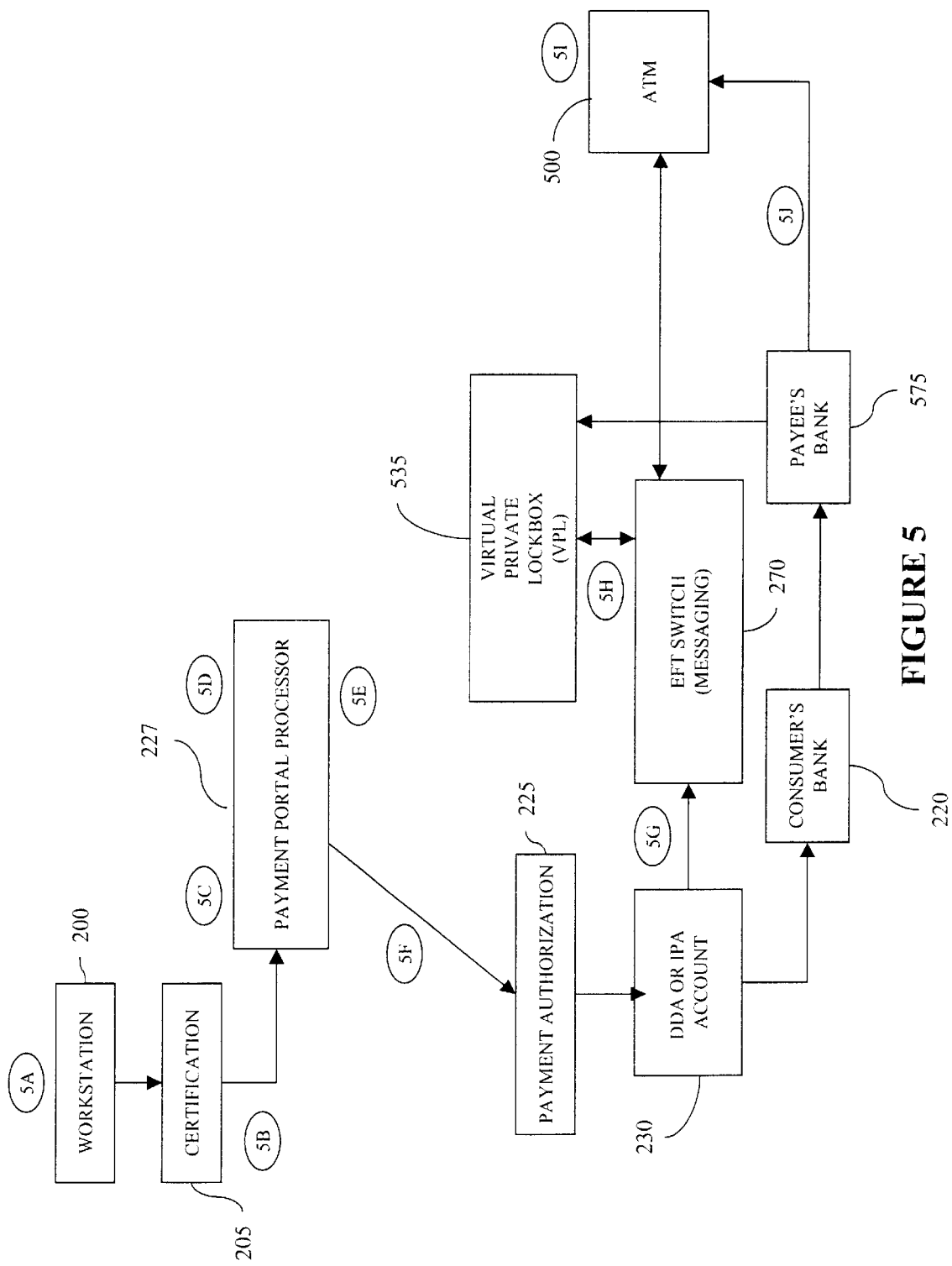
FIG. 5 illustrates a pay anyone embodiment of the present invention.

FIG. 5 illustrates an embodiment of the present invention in which the user can instantly transmit funds to anyone, specifically some one with a card and VPL account as described above. The payee (recipient of the funds) can withdraw the funds via an ATM through the use of the physical card, which the payee can either purchase at a vending machine or receive by mail when establishing an account, as described above. As with all of the embodiments of the present invention, this pay anyone feature ensures that the transaction is conducted in a secure environment.

As described above with respect to the embodiments of FIGS. 2 and 3, in the pay anyone method of FIG. 5, in steps 5A–5C, the user logs onto the Internet, launches its browser (not shown in FIG. 5) and launches its PPP 227. As readily appreciated in FIG. 5, a traditional Wallet 215 is not required to practice the essential features of the present invention, as these features are enabled by the PPP 227. In FIG. 5, the PPP 227 operated as a stand alone component. The PPP 227 requires that the user keys in its user ID and password, by which the user is then authenticated and has access to their PPP 227. The user is then presented with its account balance information and can select from several options including Shop on the Web, Pay Anyone, Pay Bills, Fund Wallet, and Check Account Activity. In the present embodiment illustrated in FIG. 5, the user in step 5D selects the Pay Anyone option from the menu and is prompted for the VPL number of the account associated with the card. The procedure set forth above with respect to the pay anyone method of FIG. 3 is then followed.

In step 5E, user's PPP 227 generates a payment authorization with the following data: Payee BIN; Payee VPL number (card number);

Transaction ID; and dollar amount. After reviewing the information, the user then selects "OK to Pay" on the workstation 200 screen (e.g., PC, PDA . . . ). In step 5F, the user's PPP 227 verifies the balance in the IPA account 230 and passes the payment authorization to IPA 230 if there are sufficient funds in the account 230 to cover the transaction. As an optional step, the payee information is validated (i.e., the VPL account associated with the card is valid and is owned by the intended payee). In step 5G, the EFT credit message is passed via the ATM switch 270 from user's bank 220 (IPA account 230) to the payee's bank 575 (VPL account 535).

The payee can withdraw the funds via an ATM 500 through the use of the physical card as described above. When the withdrawal is requested, a debit payment message is transmitted in step 5H from the payee's VPL account 535 to the ATM 500 provider bank (not shown). The payee now has immediate use of funds, and the withdrawal is made in step 5I. Alternatively, the payee can use the card at a POS using the above described PIN debit procedure. As with the previous embodiments, funds are settled once a day between the payor's bank 220, the VPL user's bank 575, and the ATM 500 provider bank.

The present embodiment is well suited for many different situations. For example, if a parent has a son or daughter away at college, the parent has provided the child with a card and associated VPL account 535, and is able to transfer funds to the child's account 535 in a simple, quick and cost efficient manner by use of the present invention. Those skilled in the art will appreciate that the above embodiment can be used by a customer of the bank to transfer funds to anyone, such as the customer's gardener or a child at college as described above.

Figure 6:
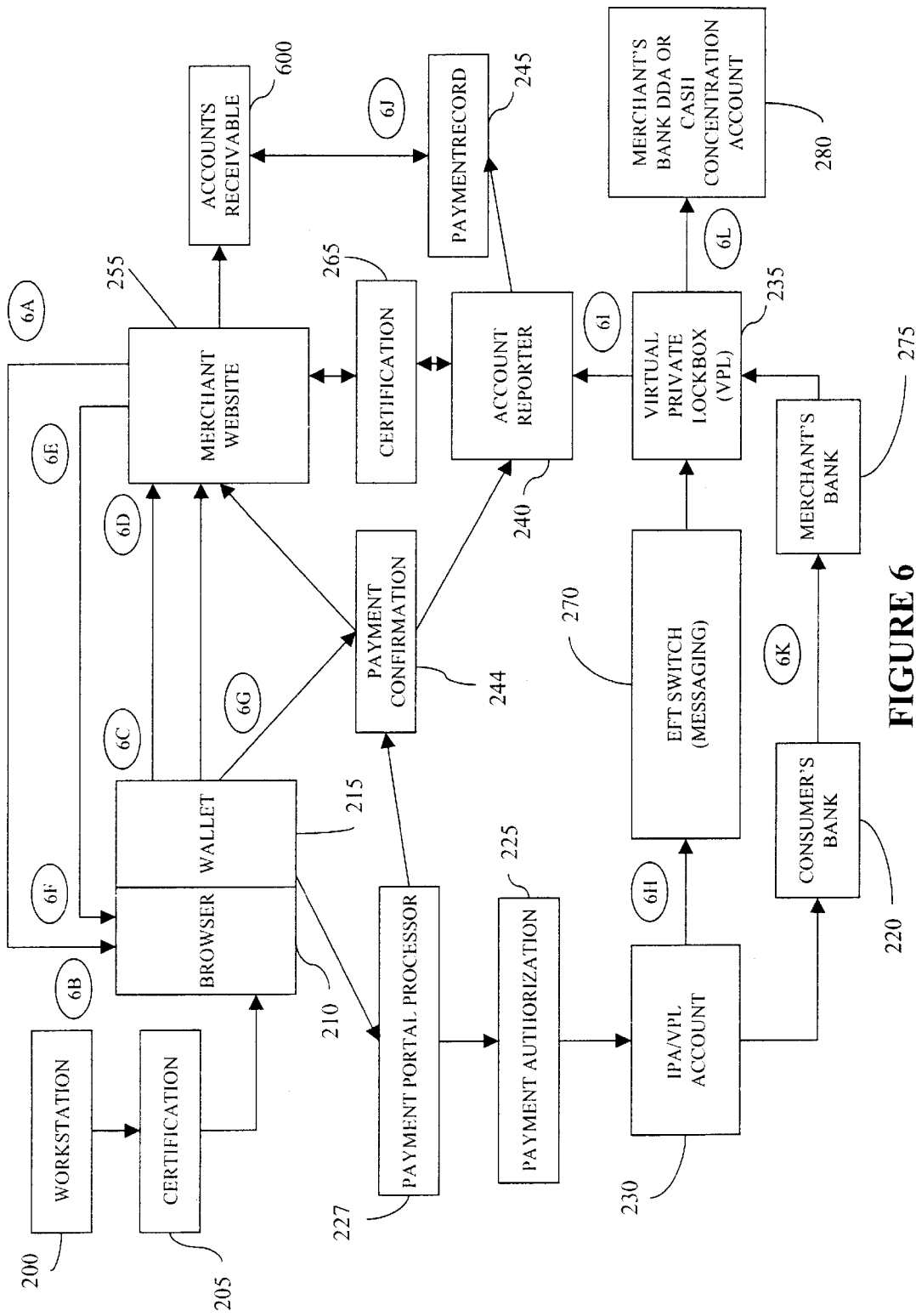
FIG. 6 illustrates a bill payment, biller direct embodiment of the present invention.
Figure 7:
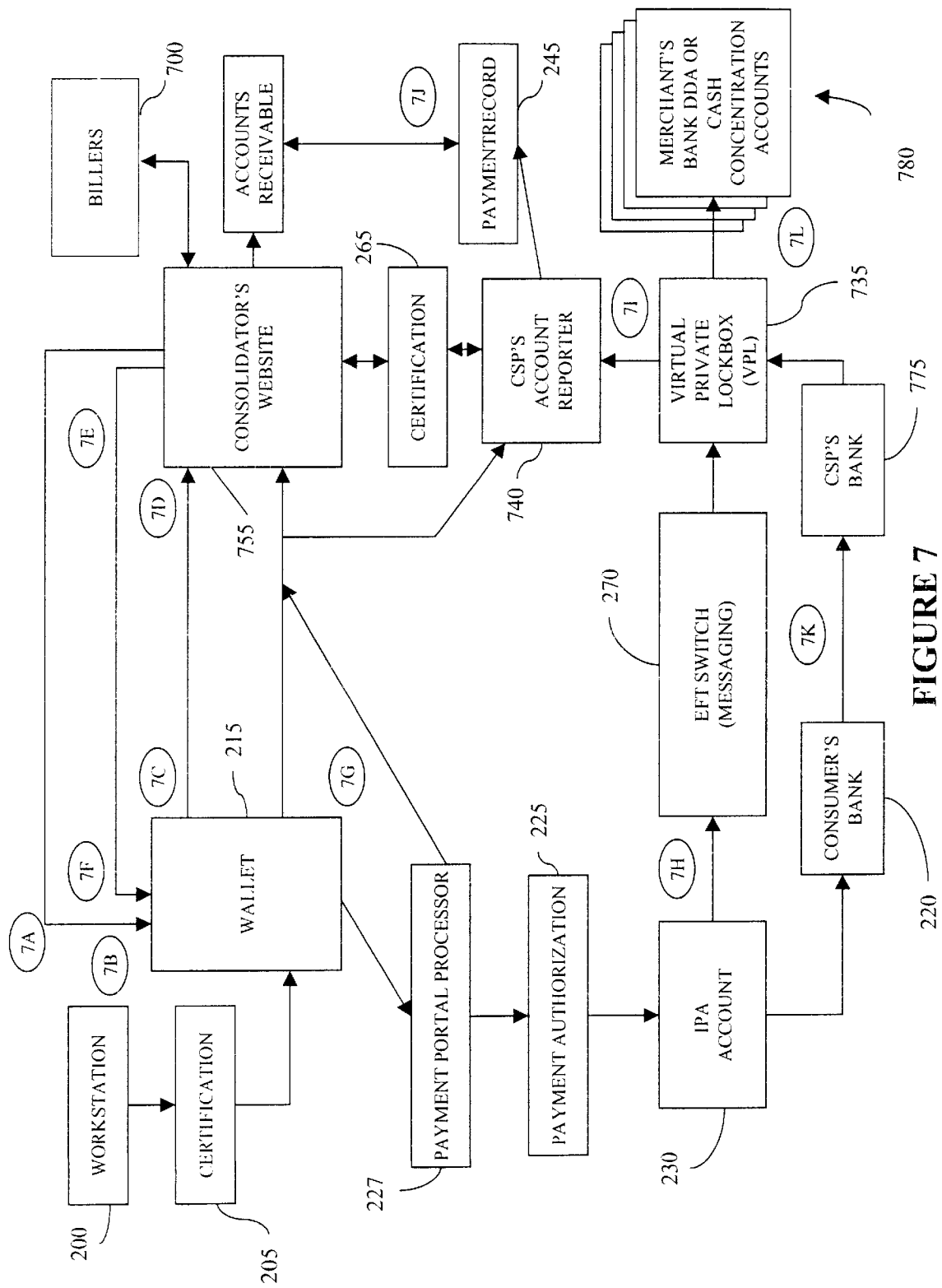
FIG. 7 illustrates a bill payment, service provider consolidation embodiment of the present invention.
Figure 8:
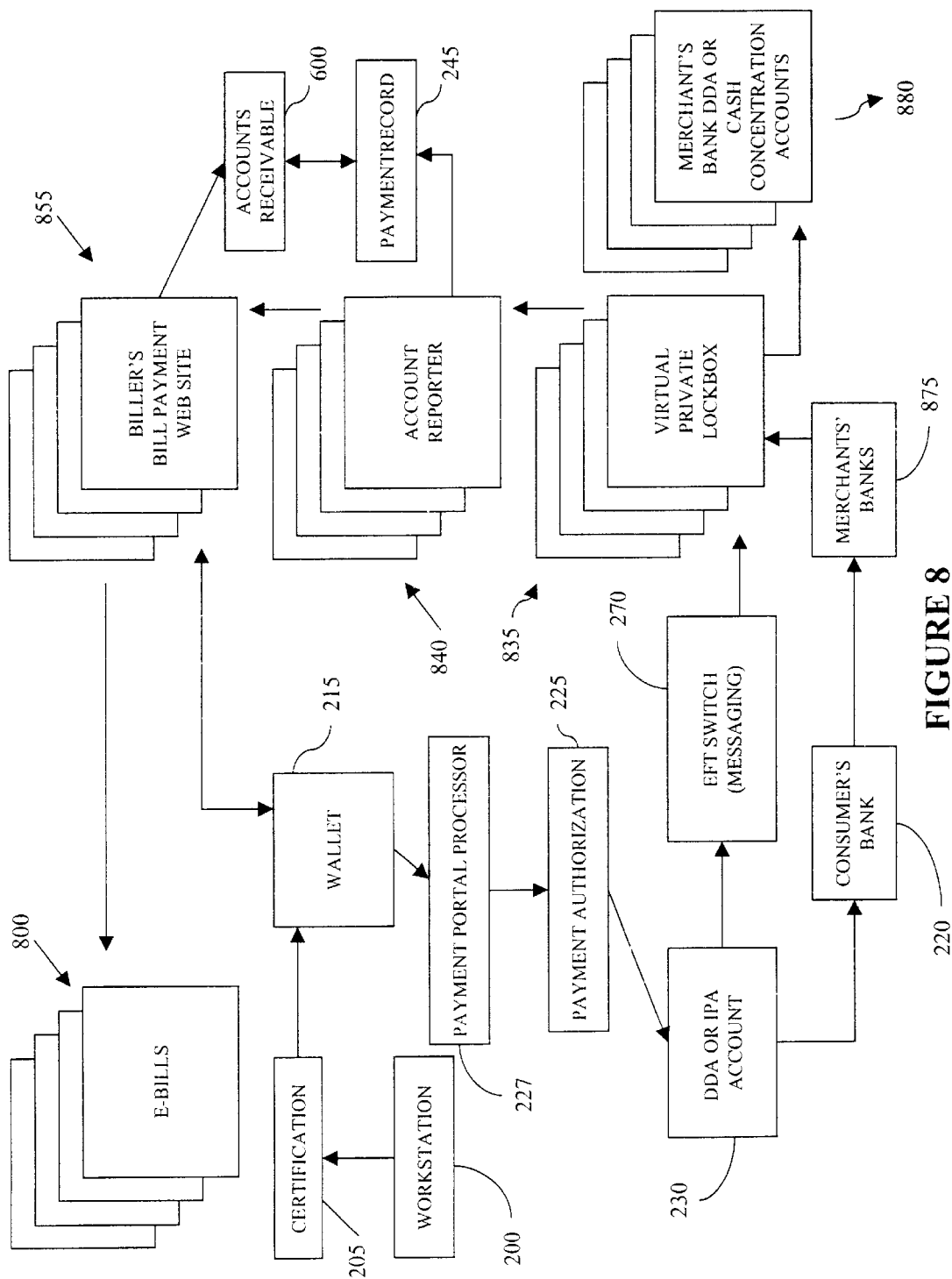
FIG. 8 illustrates a bill payment, customer consolidation embodiment of the present invention.

FIGS. 6, 7 and 8 illustrate three different bill paying embodiments according to the present invention. FIG. 6 depicts a direct bill paying embodiment, FIG. 7 describes bill payment including a service provider performing consolidation, and FIG. 8 explains a bill payment method in which the customer performs the consolidation. In FIG. 6, the direct method, a biller establishes an e-billing capability on its own web site 255. Once enrolled in the service, the customer receives an e-mail notification that a bill is available for payment at the biller's web site 255. Alternatively, the customer can receive a traditional paper bill. The customer launches its Wallet 215, Browser 210 and PPP 227 and then accesses the biller's web site 255. A payment is then eventually transmitted from the PPP 227 to the biller's Virtual Private Lockbox 235. As in all of the embodiments of the present invention, the transaction is secure, protects the customer's privacy, and provides the biller with guaranteed funding, reconcilement, and archival records.

As is illustrated in FIG. 6, the biller/merchant first establishes an e-billing relationship with its customer. One way in which the merchant might do so is to advertise its e-billing service via e-mail, mail, or on the Internet. In step 6A, it is assumed the user has enrolled in the e-bill service at biller's web site 255 and is receiving monthly Email notification when bills are available. As previously described, in step 6B the user logs onto the Internet, launches its browser 210, Wallet 215 and PPP 227 and is presented with the various menu options. In step 6C, the user selects the "Pay Bills" option and is given several options in the Pay Bills menu screen including "Pay Bills" and "Edit Billing information". Selecting the "Pay Bills" choice, the user navigates to the biller's web site 255. It must be recalled that the Wallet 215 already contains user's billing info.

Since web Wallet 215 is active, biller's website 255 recognizes the user as a Wallet 21 5 customer. In addition, the biller's website in step 6D verifies that customer has an established e-billing relationship. In step 6E, the biller's site 255 generates and transmits to the user a bill payment message that includes the following data: Biller's BIN; Biller's Account number; Transaction ID; and the dollar amount of the bill to be paid. In step 6F, the bill payment message is received by the Wallet 215 window and is displayed for review by the user. The user has several options including at least the choice to edit the bill (e.g., the amount to be paid) or the option to pay the bill as presented.

If the user selects the "pay the bill" option, the PPP 227 verifies the user's balance in its IPA account 230 and passes the payment authorization 225 to the IPA account 230 while simultaneously transmitting a payment confirmation 244 to the biller/merchant's website 255 or VPL Reporter 240 (step 6G). As alternatively shown, the PPP 227 can transmit the payment confirmation 244 to the biller/merchant's website 255 or VPL Reporter 240. In response to the receipt of the payment authorization 225, the EFT credit message is passed from the user's IPA account 230 to the biller's VPL account 235 via the ATM switch 270 (step 6H). A bill payment record 245 is then generated and stored by the biller's Account Reporter 240 in response to the receipt of the credit message from the EFT network 270.

In step 6J, upon generation of the payment record 245 which reflects the receipt of the funds to settle the bill, the payment record 245 is reconciled against the biller's accounts receivable files 600. As previously described, with the VPL account 235 and the Account Reporter 240, a billing merchant can execute secure transaction fulfilment, reconcile all its accounts, while securely archiving all its records for later, simple retrieval. As described above with respect to other embodiments, funds are settled once a day between user's bank 220 and the biller's bank 275 (step 6K). The funds can be swept to the biller's DDA or cash concentration account 280 (step 6L).

FIG. 7 depicts a further bill payment method involving service provider consolidator. This bill payment method is similar to the first illustrated in FIG. 6, however in this method a central service provider consolidates e-bills from many different billers 700. The service provider's site 755 enables a customer to review and pay bills with respect to several if not all of its billers (e.g., electric bill, phone bill, mortgage . . . ). The service provider is seamlessly outfitted with an archival capability, so that customers can review their bill payment history. The PPP 227 and IPA 230 once again provides the consumer with privacy, security and convenience while the VPL provides the service provider (and its customers, the biller/merchants) with guaranteed funding, reconcilement and archival records.

In step 7A, the user enrolls in the e-bill service at web site 755 of the Customer Service Provider (CSP). The e-billing relationship between the CSP and the user is established either directly in response to advertising by the CSP or though the billers 700 (customers of the CSP) advertising the services of the CSP to the users (who are customers of the billers). While enrolling (or at a later time) the user selects which bills it wishes to receive and pay electronically through the CSP's service. The CSP can offer an archive service to billers 700 in order to store transaction history as well as providing a customer service unit to resolve transaction inquiries.

After enrollment, the user then begins to receive monthly email notification when bills are available from the billers 700 chosen by the user. The e-bill can be sent to the user either by the CSP or directly from the biller 700 to the user.

In this second method, the biller must provide the CSP with an accounts payable file reflecting the e-bills it sent out, in order for the CSP to perform the below described reconciliation process for the biller 700. If the CSP is the party transmitting the e-bills to the users, the billers 700 must provide the CSP with the billing information. Many types of record keeping methods are supported. The billers 700 can push the billing information directly to the CSP's web site, or alternatively, the electronic bills can be channeled to the CSP via Spectrum or other electronic Internet bill payment aggregators.

Steps 7B and 7C are essentially the same as described above with respect to the direct bill paying embodiment of FIG. 6. The only difference is that after choosing the "Pay Bills" option, instead of navigating to the biller's site directly, the user navigates to the CSP's web site 755. In step 7E, the user selects which bills to pay, and keys in the dollar amount to be paid on each bill (or selects the default, which is to pay the entire amount of the bill that was presented to the user). In step 7F, CSP site 755 generates and transmits to the user one or more bill payment messages. In one embodiment, the CSP generates a single payment message that includes the appropriate payment information for all of the bills paid during the session. In an alternative embodiment, a separate payment message is generated for each of the bills paid by the user. In either embodiment, the message would include: the CSP's BIN; the CSP's VPL account number; a transaction ID (or IDs); the biller(s) name(s) and the dollar amount(s).

Steps 7F through 7L are essentially the same as described above with respect to steps 6F through 6L of FIG. 6 and the elements that are the same shall not be repeated. Although only a single VPL account 735 is illustrated in FIG. 7, it is appreciated that the CSP (or the billers directly) may maintain a VPL account 735 for each biller. Regardless of whether there is a single VPL 735 or several, the billers 700 themselves may view the contents of their receipts in the VPL 735 through the CSP's Account Reporter 740. In step 7J, the CSP performs the reconciliation process for each of its customers (i.e., the billers 700). In Step 7L, each biller's receipts are swept into their respective DDA or cash concentration accounts 780.

FIG. 8 illustrates the third bill payment embodiment involving customer consolidation. In this third bill payment method, the e-bills 800 are delivered directly to the customer in the form of an e-mail or other delivery means. Each e-bill 800 contains a hotlink, which directs the customer to the biller's web site 855 (or to a CSPs website if the CSP handles the payments for the biller). When the customer activates its Wallet 215, the web site 855 recognizes the Wallet 215 customer and initiates a payment message as previously described. The customer can then push the payment to the biller in the same manner that a payment is pushed in the web shopping embodiment of FIG. 2, the pay anyone embodiment of FIG. 3, as well as the two other bill payment embodiments of FIGS. 6 and 7 using its PPP 227. As with all the previous embodiments, the biller once again receives the guaranteed funding, reconcilement, and archival records benefits of the present invention.

Figure 9:
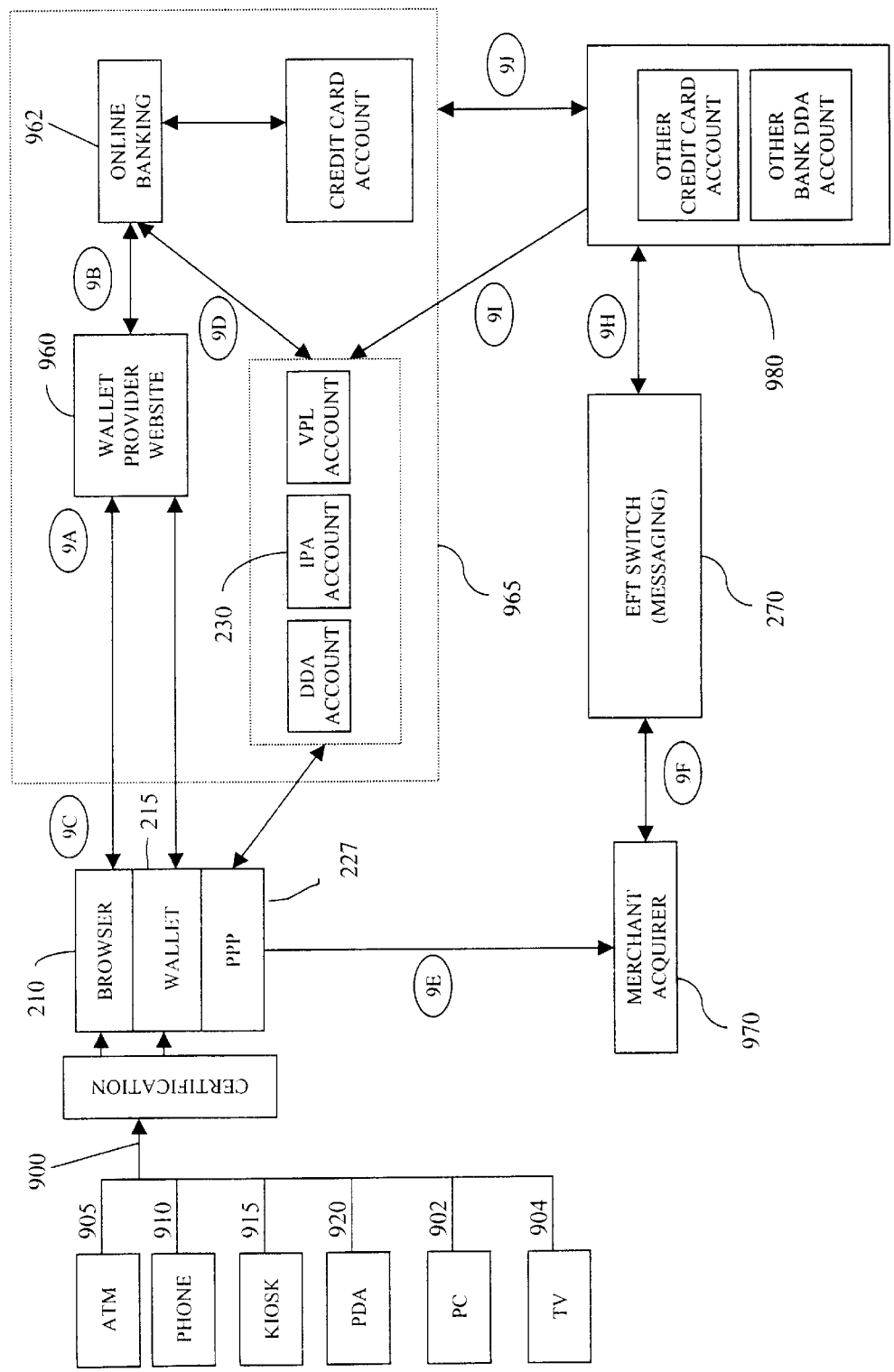
FIG. 9 illustrates a structure and process for funding an account associated with an electronic Wallet according to the present invention.

FIG. 9 depicts a system and method for establishing and funding accounts associated with a PPP 227 or a PPP enhanced Wallet 215. As described above, a user's IPA account 230 is accessed through a PPP 227 or a PPP enhanced Wallet 215 that can be accessed via the Internet 900, ATM 905, telephone 910, Kiosk 915, PC 902, an interactive TV 904, and even a Personal Digital Assistant (PDA) 920. The primary method for funding the accounts (e.g., IPA account 230) linked to the PPP 227 or PPP enhanced Wallet 215 is through one of the user's other accounts (e.g., DDA, or credit or debit card accounts). In a preferred embodiment, the PPP 227 or PPP enhanced Wallet 215 can receive funds from the other accounts of the user using well known online banking functionality. Alternative funding options can be achieved through an externally sponsored credit card, by check or money order, or through the ACH network.

Steps 9A through 9C illustrate one method by which a user can install a Wallet 215. As previously stated, the preferred embodiment includes an online banking system 962. The following example uses a fictional operator of the system denoted as XYZBank 965 which acts as a PPP enhanced Wallet provider. In step 9A, the user logs onto the Internet and uses its browser 210 to navigate to the XYZBank.com site 960. In step 9B, the user selects the "Wallet" option from main menu on the XYZBank.com site. On the "Wallet" screen the user is presented with two options: "Are you an Online Banking customer?" and "Are you a Non-XYZBank customer" If user selects "Online Banking customer", the user is presented with a list of the accounts held by the user at the XYZBank that are supported by online banking. The user then identifies the account(s) to which the PPP enhanced Wallet 215 will be linked. If the user desires, a new IPA account 230 can be established for the new PPP enhanced Wallet 215. If the user selects "Non-XYZBank customer", their PPP enhanced Wallet 215 is linked to an IPA account 230 newly set up for the customer at XYZBank 965.

Next, in step 9C the user sets up the PPP enhanced Wallet 215 for use by choosing "Install a Web Wallet" from the menu. The user is instructed that its PPP enhanced Wallet will now be installed as a button on the browser 210 toolbar. Once the software for the PPP enhanced Wallet 215 has been installed on the user's system (e.g., the user's PC or web server), the user is prompted to provide some background information that will assist the user in making web purchases and payments. An example of some of the background information requested includes the user's shipping name address. At this point, the PPP enhanced Wallet 215 installation is complete and the user can perform any of the methods described above with respect to FIGS. 1–8. As previously described, using thin Wallet technology, the majority of the software and data associated with the PPP enhanced Wallet 215 resides on a server maintained by the XYZBank 965.

Steps 9D through 9K illustrate two methods of funding the PPP enhanced Wallet 215. For customers of XYZBank 965, the primary method for initial and future funding of the PPP enhanced Wallet 215 is performed through a link between the PPP enhanced Wallet 215 and the Online Banking system 962 as described above. The link between the PPP enhanced Wallet 215 and the Online banking 962 can be transparent and the user can sign on solely to its PPP enhanced Wallet 215 and be seamlessly provided with the online banking 962 functionality. For initial funding of the PPP enhanced Wallet 215, the user selects "move funds to/from Wallet" from an online banking menu. The user then provides the following information: the source of the funds—checking, credit card, savings, etc.; the dollar amount of the transfer; the funding date; and whether this is one time transfer or a repeat transfer. Upon completion of above, the account associated with the PPP enhanced Wallet 215 is funded. Subsequent funding of the PPP enhanced Wallet 215 associated accounts can be done through the PPP enhanced Wallet 215 itself or through the online banking system 962. In addition to funding via online banking, instructions can be given for funding via phone 910, ATM 905, Kiosk 915, or PDA 920 or interactive TV 922.

Steps 9E through 9J illustrate a method of funding the PPP enhanced Wallet 215 from an external credit (e.g., cash advance from a credit card) or debit card, or an external DDA account (external to XYZBank). For the Non-XYZBank customer or an XYZBank customer wishing to fund the PPP enhanced Wallet 215 externally, the user in step 9E selects "fund with a non-XYZBank account". The user then selects the financial merchant of the account (e.g., American Express™, VISA™, etc.) and keys in account number, expiration (if applicable), and the dollar amount of the funding transfer. The funding request is transmitted to a merchant acquirer 970 associated with or part of XYZBank 962. This account information is stored for future funding requests.

In step 9F, the merchant acquirer 970 (such as Chase Merchant Services™) authorizes the funding transaction and passes the request through the EFT switch 270. In step 9G, the financial merchant 980 (e.g., VISA™) receives funding request via EFT switch 270, and verifies the card number, expiration, and credit limit. If the funding is authorized by the financial merchant (step 9H) the funds are received by the PPP enhanced Wallet 215, more specifically, the IPA/VPL account 230 linked to the PPP enhanced Wallet 215 (step 9I). The funds settlement (step 9J) between the credit card's bank and user's bank typically occurs once per day. A similar process occurs when the funding is from a user's DDA account at another financial institution 980. In the above description with respect to FIG. 9, it is appreciated that the procedure for establishing and funding a PPP enhanced Wallet 215 equally apply to establishing and funding a PPP 227 as a stand alone product.

Although the present invention has been described in relation to particular embodiments thereof, many other variations and other uses will be apparent to those skilled in the art. It is preferred, therefore, that the present invention be limited not by the specific disclosure herein, but only by the gist and scope of the disclosure.

We claim:

1. A method of receiving electronic payments comprising the steps of:
    establishing an account for receiving the electronic payments, the account being denoted as a Virtual Private Lockbox (VPL), the VPL having a first receive only address from which debits are prohibited, the VPL further having a second address through which debits and credits to the account are allowed, wherein the first receive only address and the second address are different;
    publicizing the VPL first receive only address to payors, wherein the first receive only address is an actual direct account address of the VPL; and
    receiving the electronic payments from the payors into the VPL through the first receive only address.

2. The method as recited in claim 1, wherein the step of receiving the electronic payments further comprises receiving the electronic payment as a credit over an Electronic Funds Transfer network.

3. The method as recited in claim 2, wherein the electronic payment represents a unique credit and not a reversal of a debit.

4. The method as recited in claim 1, wherein the account is a bank account maintained at a bank.

5. The method as recited in claim 1, wherein the account is maintained at an institution.

6. The method as recited in claim 5, wherein the first receive only address includes an address of the institution.

7. The method as recited in claim 1, wherein step of publishing further comprises the step of placing the first receive only address in a directory at an Internet site.

8. The method as recited in claim 7, wherein the directory contains a plurality of addresses for a plurality of VPLs.

9. The method as recited in claim 8, wherein the plurality of VPLs are associated with a plurality of businesses.

10. The method as recited in claim 1, wherein the VPL is associated with a user, the method further comprising the step of reporting the receipt of the electronic payments by the VPL to the user.

11. The method as recited in claim 10, wherein the user maintains an Internet site, the reporting step further comprising reporting the receipt of the electronic payments to the Internet site.

12. The method as recited in claim 1, further comprising the step of storing payment information with respect to each electronic payment received by the VPL.

13. The method as recited in claim 12, further comprising the step of viewing the payment information.

14. The method as recited in claim 12, wherein the payment information includes a source, date and amount of the electronic payment.

15. The method as recited in claim 12, further comprising the step of sorting the payment information.

16. The method as recited in claim 12, further comprising the step of editing the payment information.

17. The method as recited in claim 12, further comprising the step of searching the payment information.

18. The method as recited in claim 12, further comprising the step of exporting the payment information to a software application.

19. The method as recited in claim 1, wherein the VPL is associated with a user, the method further comprising the step of generating an expected payment record when the user expects the receipt of an electronic payment by the VPL.

20. The method as recited in claim 19, further comprising the steps of:
    reporting the receipt of electronic payments in the form of a payment records; and
    reconciling the payment records with the expected payment records.

21. The method as recited in claim 1, wherein at least one of the received electronic payments originated from a payor, the method further comprising the step of receiving a payment confirmation from the payor confirming a transmission of the at least one electronic payment.

22. The method as recited in claim 21, wherein the payment confirmation is received through the Internet.

23. The method as recited in claim 21, wherein the payment confirmation is received by E-mail.

24. The method as recited in claim 21, further comprising the step of generating an expected payment record in expectation of the receipt of an electronic payment by the VPL.

25. The method of claim 24, further comprising the step of reconciling payment confirmations with expected payment records.

26. A method for a merchant to receive electronic payments, the method comprising the steps of:
    establishing an account for receiving the electronic payments, the account being denoted as a Virtual Private Lockbox (VPL), the VPL having a first receive only address for receiving the electronic payments, wherein debits are prohibited from the first receive only address and the first receive only address is an actual direct account address of the VPL, the VPL further having a second address through which debits and credits to the account are allowed, wherein the first receive only address and the second address are different;

offering goods or services for sale at an Internet website of the merchant;

transmitting a payment message to a customer who has selected a good or service for purchase, the payment message identifying the first receive only address and a purchase price; and the VPL receiving an electronic payment through the first receive only address in the amount of the purchase price from the customer.

27. The method as recited in claim 26, wherein the step of receiving the electronic payment further comprises the step of receiving the electronic payment through an Electronic Funds Transfer network.

28. The method as recited in claim 26, further comprising the step of generating an account receivable record after the step of transmitting the payment message, the account receivable record identifying the customer and the purchase price.

29. The method as recited in claim 28, further comprising the step of receiving a payment confirmation from the customer, the payment confirmation confirming transmission of the electronic.

30. The method of claim 29, further comprising the step of reconciling payment confirmations with account receivable records.

31. The method of claim 29, further comprising the step of releasing the selected goods to the customer after receipt of the payment confirmation.

32. The method of claim 31, wherein the selected goods are digital in nature, the step of releasing the selected goods further comprises the step of transmitting the selected goods to the customer over the Internet.

33. The method of claim 31, wherein the selected goods are physical in nature, the step of releasing the selected goods further comprises the steps of:

notifying a warehouse of the releasing of the goods; and contacting a shipper to arrange for shipment of the selected goods.

34. A Virtual Private Lockbox (VPL) account system comprising:

a first receive only address into the VPL account, the first receive only address being a receive only address for receiving electronic payments into the VPL account, wherein debits are prohibited from the first receive only address and wherein the first receive only address is an actual direct account address of the VPL account; and a second address for sweeping finds out of the VPL account, wherein the first receive only address and the second address are different.

35. The system as recited in claim 34, wherein the first receive only address is accessible by an Electronic Funds Transfer network, the electronic payments being received by the first receive only address as credits over the Electronic Funds Transfer network.

36. The system as recited in claim 35, wherein the electronic payments represents unique credits and not reversals of previous debits.

37. The system as recited in claim 34, further comprising a third address into the VPL account, wherein a user of the VPL account has access to the third address for transferring funds out of the VPL account.

38. The system as recited in claim 37, wherein the first, second and third addresses are different.

39. The system as recited in claim 34, wherein the VPL account is a bank account maintained at a bank.

40. The system as recited in claim 34, wherein the VPL account is maintained at an institution.

41. The system as recited in claim 40, wherein the first receive only address includes an address of the institution.

42. The system as recited in claim 34, further comprising:

an account reporting module coupled to the VPL account, the account reporting module reporting the receipt of the electronic payments by the VPL account.

43. The system as recited in claim 34, further comprising:

a transaction database; and an account reporting module coupled to the VPL account and coupled to the transaction database, the account reporting module storing payment information in the transaction database with respect to each electronic payment received by the VPL account.

44. The system as recited in claim 43, wherein the account reporter enables viewing of the payment information stored in the transaction database.

45. The system as recited in claim 43, wherein the payment information includes a source, date and amount of the electronic payment.

46. The system as recited in claim 43, wherein the account reporter enables sorting of the payment information stored in the transaction database.

47. The system as recited in claim 43, wherein the account reporter enables editing of the payment information stored in the transaction database.

48. The system as recited in claim 43, wherein the account reporter enables searching of the payment information stored in the transaction database.

49. The system as recited in claim 43, wherein the transaction database stored an expected payment records when the receipt of an electronic payment by the VPL account is expected.

50. The system as recited in 49, wherein the account reporter reconciles the payment records with the expected payment records.

51. The method as recited in claim 43, further comprising the step of transferring funds out of the account through the second address.

52. A Virtual Private Lockbox (VPL) account comprising:

a first receive only address of the VPL account for receiving electronic payments into the VPL account, wherein debits are prohibited from the first receive only address, and wherein the first receive only address is an actual direct account address of the VPL; and a second address of the VPL account, wherein debits from the VPL account are permitted using the second address, wherein the first receive only address and the second address are different.

53. The VPL account as recited in claim 52, wherein credits to the VPL account are permitted using the second address.

54. The VPL account as recited in claim 52, wherein the second address is a traditional address of a Demand Deposit Account (DDA).

55. The VPL account as recited in claim 52, wherein the first receive only address does not require translation.

56. The VPL account as recited in claim 52, wherein the first receive only address is made publicly available.

57. A method for establishing an account for receiving electronic payments comprising:

establishing an account for receiving the electronic payments, the account being denoted as a Virtual Private Lockbox (VPL), establishing a first receive only address for the VPL from which debits are prohibited, wherein the first receive only address is an actual direct account address of the VPL; and establishing a second address of the VPL account, wherein debits from the VPL account are permitted using the second address, wherein the first receive only address and the second address are different.

58. The method as recited in claim 57, further comprising making the VPL first receive only address publicly available.

59. The method as recited in claim 57, wherein the first receive only address does not require translation.

60. The method as recited in claim 57, further comprising permitting credits to the VPL account are permitted using the second address.

61. The system as recited in claim 34, wherein the second address is only accessible by a supervisor of the VPL account.

* * * * *